US011152965B2

United States Patent
Hay et al.

(10) Patent No.: US 11,152,965 B2
(45) Date of Patent: Oct. 19, 2021

(54) STATE-MACHINE BASED BODY SCANNER IMAGING SYSTEM

(71) Applicant: Analog Devices, Inc., Norwood, MA (US)

(72) Inventors: Christopher E Hay, Colorado Springs, CO (US); Eamon Nash, Chicago, IL (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 16/989,738

(22) Filed: Aug. 10, 2020

(65) Prior Publication Data

US 2020/0373953 A1 Nov. 26, 2020

Related U.S. Application Data

(62) Division of application No. 15/989,001, filed on May 24, 2018, now Pat. No. 10,804,942.

(51) Int. Cl.
*H04B 1/04* (2006.01)
*G01S 13/89* (2006.01)
(Continued)

(52) U.S. Cl.
CPC .......... *H04B 1/0475* (2013.01); *G01S 13/887* (2013.01); *G01S 13/89* (2013.01); *G05B 17/02* (2013.01); *H04B 2001/0491* (2013.01)

(58) Field of Classification Search
CPC .......... H04B 1/0475; H04B 2001/0491; H04B 2001/0416; H04B 1/0483; G01S 13/89;
(Continued)

(56) References Cited

U.S. PATENT DOCUMENTS 6,799,233 B1 9/2004 Deshpande et al.
7,194,236 B2 3/2007 Lovberg et al.
(Continued)

FOREIGN PATENT DOCUMENTS

CN 1202744 A 12/1998
CN 1823281 A 8/2006
(Continued)

OTHER PUBLICATIONS

Moulder, W.F., et al., "Development of a High-Throughput Microwave Imaging System for Concealed Weapons Detection", MIT Lincoln Laboratory, 2016 IEEE.
(Continued)

*Primary Examiner* — Kabir A Timory
(74) *Attorney, Agent, or Firm* — Knobbe Martens Olson & Bear, LLP

(57) ABSTRACT

A pair of programmable state machines may be included in a transmitter integrated circuit of a scanner (e.g. a body scanner) to control the sub-circuits of the transmitter integrated circuit. The first programmable state machine may be used to control the signal processor of the transmitter that facilitates generation of a signal to be transmitted at a target, such as a user to be scanned. The second programmable state machine may be used to control the transmitter's selection of a transmission channel for transmitting the signal in which provides the signal to be transmitted to an antenna. Further, the receiver integrated circuit of the scanner may include a similar pair of programmable state machines for controlling the receive signal processor and receiver of the receiver integrated circuit. The inclusion of the state machines can reduce both the scan time and the circuit complexity of the scanner.

20 Claims, 13 Drawing Sheets

(51) Int. Cl.
*G05B 17/02* (2006.01)
*G01S 13/88* (2006.01)

(58) Field of Classification Search
CPC ............... G01S 13/887; G01S 7/4008; G01S 2007/4013; G01S 7/032; G01S 7/02; G01S 2007/028; G05B 17/02; G01V 3/12
See application file for complete search history.

(56) References Cited

U.S. PATENT DOCUMENTS

| | | |
|---|---|---|
| 7,248,204 B2 | 7/2007 | Lovberg et al. |
| 7,365,672 B2 | 4/2008 | Keller et al. |
| 7,378,658 B2 | 5/2008 | Mueller et al. |
| 7,385,549 B2 | 6/2008 | Lovberg et al. |
| 7,405,692 B2 | 7/2008 | McMakin et al. |
| 7,415,244 B2 | 8/2008 | Kolinko et al. |
| 7,889,113 B2 | 2/2011 | Cardiasmenos et al. |
| 7,982,656 B2 | 7/2011 | Coward et al. |
| 8,390,504 B2 | 3/2013 | Abdillah et al. |
| 2008/0228076 A1 | 9/2008 | Azuma |
| 2009/0104900 A1 | 4/2009 | Lee |
| 2011/0102233 A1 | 5/2011 | Johnson |
| 2011/0210734 A1 | 9/2011 | Darrow et al. |
| 2013/0021192 A1 | 1/2013 | Daly |
| 2015/0285897 A1 | 10/2015 | Kilty et al. |
| 2015/0285907 A1 | 10/2015 | Mohamadi |
| 2016/0262729 A1* | 9/2016 | Srinivasan .......... G01S 7/52085 |
| 2018/0052230 A1 | 2/2018 | Hirai |
| 2018/0309472 A1 | 10/2018 | Kumar |

FOREIGN PATENT DOCUMENTS

| | | |
|---|---|---|
| CN | 102332960 A | 1/2012 |
| CN | 103248432 A | 8/2013 |
| DE | 69526433 T2 | 4/2002 |
| DE | 102007051190 A1 | 4/2008 |
| EP | 3018636 A1 | 5/2016 |
| WO | WO 2018078627 A1 | 5/2018 |

OTHER PUBLICATIONS

Sheen, D.M., et al., "Wide-bandwith, wide-beamwidth, high-resolution, millimeter-wave imaging for concealed weapon detection", Pacific Northwest National Laboratory, obtained Jan. 24, 2018.

Tiebout, M., et al., "Low Power Wideband Receiver and Transmitter Chipset for mm-Wave Imaging in SiGe Bipolar Technology", IEEE Journal of Solid-State Circuits, vol. 47, No. 5, May 2012, pp. 1175-1184.

Official Communication received in Chinese Application No. 201910436816.1 dated Sep. 1, 2020 in 9 pages.

Office Action received in German Application No. 10 2019 110 308.8, dated Apr. 21, 2020 in 9 pages.

* cited by examiner

| TX State | 1 | 2 | 3 | 4 | 5 | 6 | 7 | 8 |
|---|---|---|---|---|---|---|---|---|
| 0 (reset) | S | S | S | S | S | S | S | S |
| 1 | R | S | S | S | S | S | S | S |
| 2 | CH1 | S | S | S | S | S | S | S |
| 3 | CH2 | S | S | S | S | S | S | S |
| 4 | CH3 | S | S | S | S | S | S | S |
| 5 | CH4 | R | S | S | S | S | S | S |
| 6 | R | CH1 | S | S | S | S | S | S |
| 7 | S | CH2 | S | S | S | S | S | S |
| 8 | S | CH3 | S | S | S | S | S | S |
| 9 | S | CH4 | R | S | S | S | S | S |
| 10 | S | R | CH1 | S | S | S | S | S |
| 11 | S | S | CH2 | S | S | S | S | S |
| 12 | S | S | CH3 | S | S | S | S | S |
| 13 | S | S | CH4 | R | S | S | S | S |
| 14 | S | S | R | CH1 | S | S | S | S |
| 15 | S | S | S | CH2 | S | S | S | S |
| 16 | S | S | S | CH3 | S | S | S | S |
| 17 | S | S | S | CH4 | R | S | S | S |
| 18 | S | S | S | R | CH1 | S | S | S |
| 19 | S | S | S | S | CH2 | S | S | S |
| 20 | S | S | S | S | CH3 | S | S | S |
| 21 | S | S | S | S | CH4 | R | S | S |
| 22 | S | S | S | S | R | CH1 | S | S |
| 23 | S | S | S | S | S | CH2 | S | S |
| 24 | S | S | S | S | S | CH3 | S | S |
| 25 | S | S | S | S | S | CH4 | R | S |
| 26 | S | S | S | S | S | R | CH1 | S |
| 27 | S | S | S | S | S | S | CH2 | S |
| 28 | S | S | S | S | S | S | CH3 | S |
| 29 | S | S | S | S | S | S | CH4 | R |
| 30 | S | S | S | S | S | S | R | CH1 |
| 31 | S | S | S | S | S | S | S | CH2 |
| 32 | S | S | S | S | S | S | S | CH3 |
| 33 | S | S | S | S | S | S | S | CH4 |

FIG. 7

STATE-MACHINE BASED BODY SCANNER IMAGING SYSTEM

INCORPORATION BY REFERENCE TO ANY PRIORITY APPLICATIONS

This application is a divisional of U.S. application Ser. No. 15/989,001, filed May 24, 2018, and titled "STATE-MACHINE BASED BODY SCANNER IMAGING SYSTEM," the disclosure of which is hereby incorporated by reference in its entirety for all purposes herein. Any and all applications, if any, for which a foreign or domestic priority claim is identified in the Application Data Sheet of the present application are hereby incorporated by reference in their entireties under 37 CFR 1.57.

FIELD OF THE DISCLOSURE

The described technology generally relates to imaging a target and, more specifically, to apparatus and methods that use one or more state machines to control a plurality of imaging circuits that generate an image of a target.

BACKGROUND

It is often desirable to scan people with a body scanner to detect potential contraband. For example, metal detectors and body scanners are often used to detect weapons within particular environments, such as airports. A body scanner may be used to create an image of a person and to determine if the person has secreted a weapon or other contraband on his or her body or clothing.

Body scanners are not instantaneous. It takes time for the body scanner to fully scan a person and create an image of the person. As a result, places that have many visitors often develop long lines. For example, it is not uncommon for an airport security line to take thirty minutes due in part to the amount of time it takes to scan people in the security line.

SUMMARY OF THE DISCLOSURE

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

A pair of programmable state machines may be included in a transmitter integrated circuit of a scanner (e.g. a body scanner) to control the sub-circuits of the transmitter integrated circuit. The first programmable state machine may be used to control the signal processor of the transmitter integrated circuit that facilitates generation of a signal to be transmitted at a target, such as a user to be scanned. The second programmable state machine may be used to control the selection of a transmission channel for transmitting the signal which provides the signal to be transmitted to an antenna. Further, the receiver integrated circuit of the scanner may include a similar pair of programmable state machines for controlling the receive signal processor and receiver of the receiver integrated circuit. The inclusion of the state machines can reduce both the scan time and the circuit complexity of the scanner.

Certain embodiments of the present disclosure relate to a transmitter integrated circuit for transmitting a signal within an imaging system to generate an image of a target. The transmitter integrated circuit may include: a transmission signal processor configured to multiply an oscillator signal to generate a transmission signal within a target frequency band and to filter one or more harmonics from the transmission signal, wherein the target frequency band is one of a plurality of target frequency bands; a transmitter configured to amplify the transmission signal to generate an amplified transmission signal and to provide the amplified transmission signal to one or more of a plurality of antennas associated with a plurality of transmission channels, wherein each antenna of the plurality of antennas is associated with a different transmission channel of the plurality of transmission channels; a first state machine configured to control the transmission signal processor; and a second state machine configured to control the transmitter.

Additional embodiments of the present disclosure relate to a receiver integrated circuit for receiving a signal within an imaging system to generate an image of a target. The receiver integrated circuit may include: a receive signal processor configured to multiply an oscillator signal by a multiplication factor to generate a target oscillator signal within a target frequency band and to filter one or more harmonics from the target oscillator signal, wherein the target frequency band is one of a plurality of target frequency bands; a receiver configured to receive a receive signal from one of a plurality of antennas, wherein the target oscillator signal is offset from the receive signal by an offset frequency; and a first state machine configured to control the receive signal processor.

Some additional embodiments of the present disclosure relate to an imaging system configured to generate an image of a target. The imaging system may include: a plurality of transmitter integrated circuits; and a plurality of receiver integrated circuits, wherein each of the plurality of transmitter integrated circuits may include: a first state machine configured to cause a transmission signal processor of the transmitter integrated circuit to generate a transmission signal of a target frequency based on a current state of the first state machine; and a second state machine configured to cause a transmitter of the transmission signal processor to transmit the transmission signal using a transmission channel selected from a plurality of transmission channels based at least in part on a current state of the second state machine; and each of the plurality of receiver integrated circuits may include a first state machine configured to cause a receive signal processor of the receiver integrated circuit to generate an oscillator signal offset from a receive signal by an offset frequency, wherein the oscillator signal is mixed with the receive signal to generate an output signal at the offset frequency.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 7 illustrates a portion of an example state chart for a set of transmitter integrated circuits controlled by the example controller of FIG. 6 in accordance with certain embodiments.

DETAILED DESCRIPTION

Figure 1B:
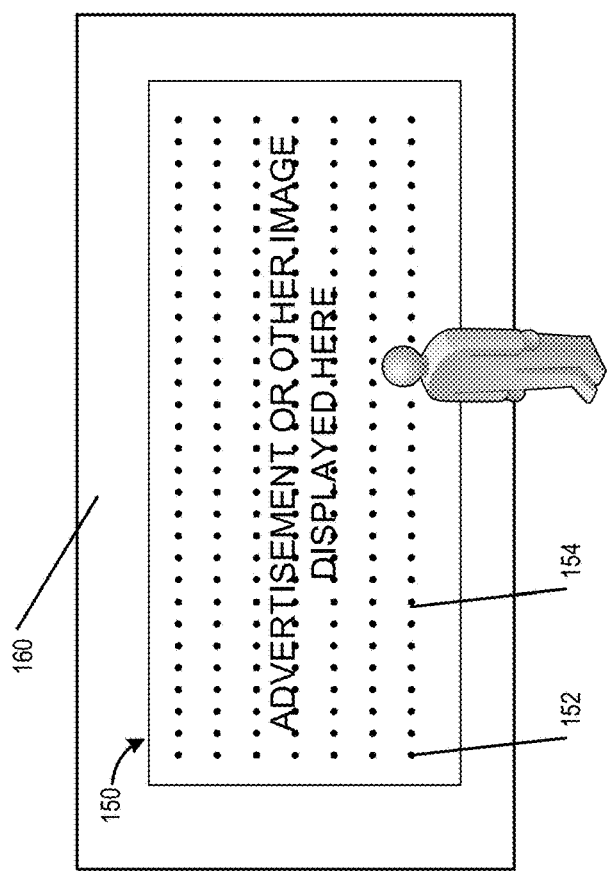
FIG. 1B illustrates an alternative example of a body scanner portion of an imaging system in accordance with certain embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A body scanner, security scanner, or other imaging system used to scan a person may operate by bouncing signals off of the person. For example, a set of transmitters may transmit a set of signals at a target, such as a user walking through a security scanner, and a set of receivers may receive the transmitted signals. When the signals encounter the target, the signals may pass through the target, be reflected, or be refracted at different angles based on the material that the signals hit and the angle at which the signals hit the target. An image processor in communication with the set of receivers may generate an image of the target in the imaging system based at least in part on the received signals, and how the target has affected the transmission of the signals.

To get an image of sufficient quality to be able to recognize the target, or to determine whether a person is carrying contraband, such as a weapon, imaging systems may often use signals of varying frequencies. The greater the number of frequencies used and/or the larger the frequency bandwidth of the body scanner, the more accurate the image that can be generated of a user or target. However, it is often time consuming for the imaging systems or body scanners to vary the signal frequencies and to hit the target with a sufficient number of signals to obtain or generate an accurate image of the target. For such imaging systems or body scanners to reliably generate an image of a user, it is often necessary for the user to stand still for some period of time. Accordingly, long lines can often form when a large number of people are to be scanned by a body scanner, such as the security scanners often found at airports. To reduce the amount of time for scanning a user, many body scanners use relatively narrow frequency bands, such as 10 GHz or less. Further, many existing body scanners require a person to stand still while they are scanned. Such body scanners are often not well-suited for people who have trouble standing still or for environments that do not have a well-defined path or consist of large open spaces, such as many train stations, malls, or open amphitheaters. It is therefore desirable to develop a scanner than does not require a user to stand within the scanner, but that can generate an image of the user as the user walks through the scanner. Existing scanners are not fast enough to create an image of the user without requiring the user to stop and wait within the scanner.

Further, to get an image of a larger target, in many cases it is necessary to have many signals hit the target from many different angles and positions. Thus, many image scanners have a large number of channels corresponding to an equally large number of transmitters and antennas that transmit signals at the target. Often there are thousands of channels. It is typically not possible for all of the channels to transmit simultaneously because, for example, the signals can interfere with each other. To prevent the channels from transmitting simultaneously, many existing systems include a switch for each of the thousands of channels that can be separately controlled to activate or deactivate a channel. These switches can be expensive both monetarily and in terms of space and power utilization.

Embodiments disclosed herein present a transmitter and a receiver system that can be used with different target scanning or imaging systems including security scanners. The transmitter and receiver systems can operate over a larger bandwidth than existing systems resulting in more accurate images. Further, the transmitter and receiver systems can operate faster than existing systems enabling the use of a larger bandwidth without increasing the amount of time to scan a user or other target. Moreover, the increased operating speed of the transmitter and receiver systems enable security scanners using the transmitter and receiver systems to be used in a greater variety of applications.

In certain embodiments, the transmitter system includes a state machine (which may also be referred to as a sequencer) that controls a state of the transmitter system. The state machine can adjust the frequency transmitted by the transmitter system causing the transmitter system to sweep a set of supported frequencies. Advantageously, in certain embodiments, the state machine enables the transmitter to transition frequencies faster than the transmitters used in existing body scanners. In certain embodiments, the transmitter system can switch frequency bands within 10 ns or less. Further, the state machine enables a reduction of switches used to activate or deactivate different channels within an image system that includes the transmitter system. Accordingly, in certain embodiments, the systems presented herein can use less space and power, and can be cheaper than existing systems.

Further, in certain embodiments, the transmitter system may include a second state machine that controls the channels that are transmitting the signals. In certain embodiments, the transmitter system can switch channels within 1-2 ns. In certain embodiments, an imaging system may have as many as 4000 channels. In such systems, the imaging system can scan a target within 10-20 ms. The scan time may vary based on the number of channels and the size of the frequency band. By scanning a target within 10-20 ms, it is possible to create a body scanner that does not require a user to stop walking to generate the image of the user.

Similarly, in certain embodiments, the receiver system may include a state machine that controls a frequency used by the receiver to process a received frequency. The receiver may reduce a received frequency to a lower frequency by mixing an oscillator frequency with the received frequency. The state machine may control the frequency mixed with the received frequency. In addition, the receiver may include a second state machine that controls the receive channel(s) that is active.

Example Scanners

Figure 1A:
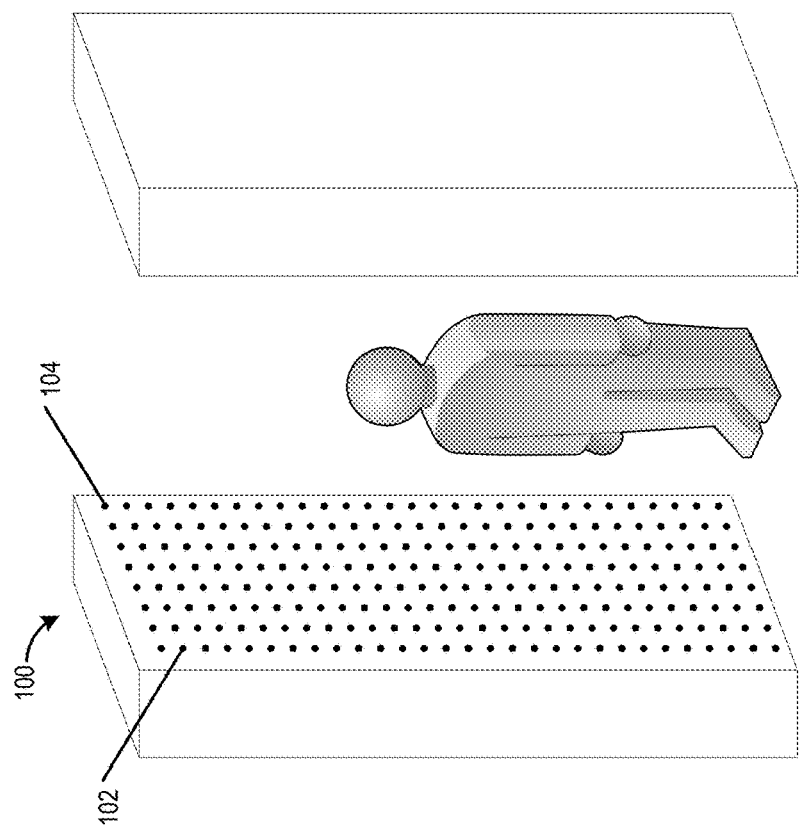
FIG. 1A illustrates an example of a body scanner portion of an imaging system in accordance with certain embodiments.

FIG. 1A illustrates an example of a body scanner 100 portion of an imaging system in accordance with certain embodiments. The imaging system may include additional systems not depicted within FIG. 1A. For example, the imaging system may include a computing system that displays an image generated by the body scanner 100 to a user.

The body scanner 100 may include a number of transmitter integrated circuits 102 and receiver integrated circuits 104. The transmitter integrated circuits 102 and the receiver integrated circuits 104 may be located on opposite walls of the body scanner 100. Alternatively, or in addition, the transmitter integrated circuits 102 and the receiver integrated circuits 104 may be located on alternating rows or columns of one or both walls of the body scanner 100. A user may walk through the body scanner 100 and the transmitter integrated circuits 102 may transmit a signal via one or more channels of the transmitter integrated circuits 102. The signal may hit a user walking through the body scanner 100. Further, a receiver integrated circuit 104 may receive the signal and generate an image of the user based at least in part on the received signal.

The body scanner 100 is one non-limiting example of a body scanner that can be used to generate an image of the user. Other types of scanners are possible. For example, in one embodiment, the transmitter integrated circuits may be positioned on a movable arm that moves around the user as the user walks through the body scanner. Similarly, the receiver integrated circuits may be positioned on the movable arm or on a non-movable wall.

FIG. 1B illustrates an alternative example of a body scanner 150 portion of an imaging system in accordance with certain embodiments. The body scanner 150 may consist of a panel attached to a wall 160. The body scanner 150 may include a number of transmitter integrated circuits 152 and the number of receiver integrated circuits 154. Body scanner 150 may generate an image of a user by transmitting signals that are absorbed, reflected, or refracted off of the user. In certain embodiments, another portion of the body scanner 150 may be located on a wall opposite to the wall 160. In other embodiments, the body scanner 150 may be composed entirely of the fee portion located on the wall 160. Advantageously, in certain embodiments, because of the speed with which the transmitter integrated circuits 152 and the receiver integrated circuits 154 disclosed herein can change frequencies and/or channels, is possible for the body scanner 150 to generate an image of the user as the user walks by the body scanner 150. In some embodiments, an image of the user may be displayed on the body scanner 150. In other embodiments, an advertisement or other image may be displayed on the body scanner 150 such that users may be unaware that the body scanner 150 exists on the wall 160. It should be understood that the transmitter integrated circuits and receiver integrated circuits disclosed herein can be used with other imaging systems besides those depicted in FIGS. 1A and 1B.

Example Imaging System

Figure 2:
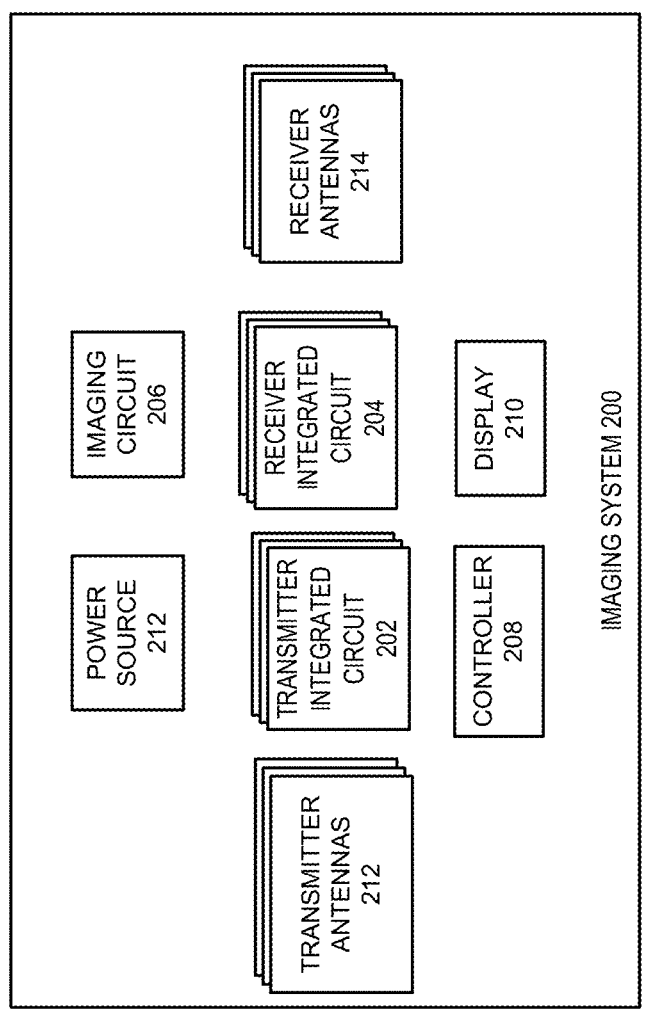
FIG. 2 is a block diagram illustrating an example imaging system in accordance with certain embodiments.

FIG. 2 is a block diagram illustrating an example imaging system 200 in accordance with certain embodiments. The illustrated imaging system 200 may be a body scanner or other scanning device capable of generating an image of a target, such as a user. Further, the illustrated imaging system 200 may be used to detect contraband, such as weapons carried by a user. As depicted in FIG. 2, the imaging system 200 may include a number of transmitter integrated circuits 202. The number of transmitter integrated circuits 202 included in the imaging system 200 may be application specific. For example, the imaging system 200 may include 500 transmitter integrated circuits, 1000 transmitter integrated circuits, 2000 transmitter integrated circuits, any number of transmitter integrated circuits between the foregoing examples, or any other number of transmitter integrated circuits 202. Each of the transmitter integrated circuits 202 may be configured to transmit a signal of one or more different frequencies. The signal may be transmitted on one or more channels by one or more transmitter antennas 212. In certain embodiments, each transmitter integrated circuit 202 may be in communication with a plurality of transmitter antennas 212. Further, in certain embodiments, each transmitter integrated circuit 202 may have a plurality of channels. For example, each transmitter integrate circuit 202 may have 2, 3, 4, 8, or any other number of channels. Thus, an imaging system with 1000 transmitter integrated circuit 202 that each has 4 channels may have 4000 total channels. Further, each channel may be associated with a different antenna.

The imaging system 200 further includes a number of receiver integrated circuits 204. The number of receiver integrated circuits 204 included in the imaging system 200 may be application specific. For example, imaging system 200 may include 500 receiver integrated circuits, 1000 receiver integrated circuits, 2000 receiver integrated circuits, any number of receiver integrated circuits between the foregoing examples or any other number of receiver integrated circuits 204. In some embodiments, imaging system 200 includes the same quantity of receiver integrated circuits as transmitter integrated circuits. Each of the receiver integrated circuits 204 may be configured to receive a signal of one or more different frequencies. The signal may be received from one of the transmitter integrated circuits 202 further, the signal may be received by one or more receiver antennas 214. In certain embodiments, each receiver integrated circuit 204 may be in communication with the plurality of receiver antennas 214. As with the transmitter integrated circuits 202, the receiver integrated circuits may be associated with a number of receive channels. Thus, for example, an imaging system 200 with 1000 receiver integrated circuits 204 may have 2000 or 4000 total channels if each receiver integrated circuit 204 has 2 or 4 channels.

The imaging system 200, and the illustrated subsystems thereof, may be distributed among multiple physical elements. For example, the transmitter integrated circuits 202 and corresponding transmitter antennas 212 may be included in a separate physical structure from the receiver integrated circuits 204 and corresponding receiver antennas 214. For instance, as illustrated in FIG. 1A, an imaging system may consist of two panels or walls that are spaced so as to enable a user to walk between the walls. In certain embodiments, the transmitter integrated circuits 202 and corresponding transmitter antennas 212 may be distributed among the two panels or walls. The receiver integrated circuits 204 and corresponding receiver antennas 214 may similarly be distributed among the two panels or walls. In certain embodiments, each receiver integrated circuit 204 and corresponding receiver antenna 214 is positioned so as to be opposite from and facing a transmitter integrated circuit 202 and corresponding transmitter antenna 212.

The imaging system 200 may also include a controller 208. The controller 208 may be configured to control and/or program one or more transmitter integrated circuits 202 and one or more receiver integrated circuits 204. In some embodiments, a separate controller may exist for the transmitter integrated circuits 202 and the receiver integrated circuits 204. The controller 208 may be used to program one or more state machines of the transmitter integrated circuits 202 and/or one or more state machines of the receiver integrated circuits 204. In some embodiments, the controller 208 may further be used to synchronize and/or initiate state machine of a transmitter integrated circuit 202 and a state machine of a receiver integrated circuit 204.

Imaging system 200 may include a number of additional subsystems. For example, the imaging system 200 may include an imaging circuit 206, a display 210, and a power source 212. The imaging circuit 206 may include any type of imaging circuit and/or software for creating an image of a target based at least in part on signals received by the receiver integrated circuit 204. The image may be a three-dimensional image. Further, the image of the target may be displayed on the display 210 to a user and/or may be transmitted to another system via a network. The power source 212 may include any type of power source for powering the imaging system 200, such as a battery or power supply, or other connection to a primary power supply of a building.

Example Transmitter Integrated Circuit

Figure 3:
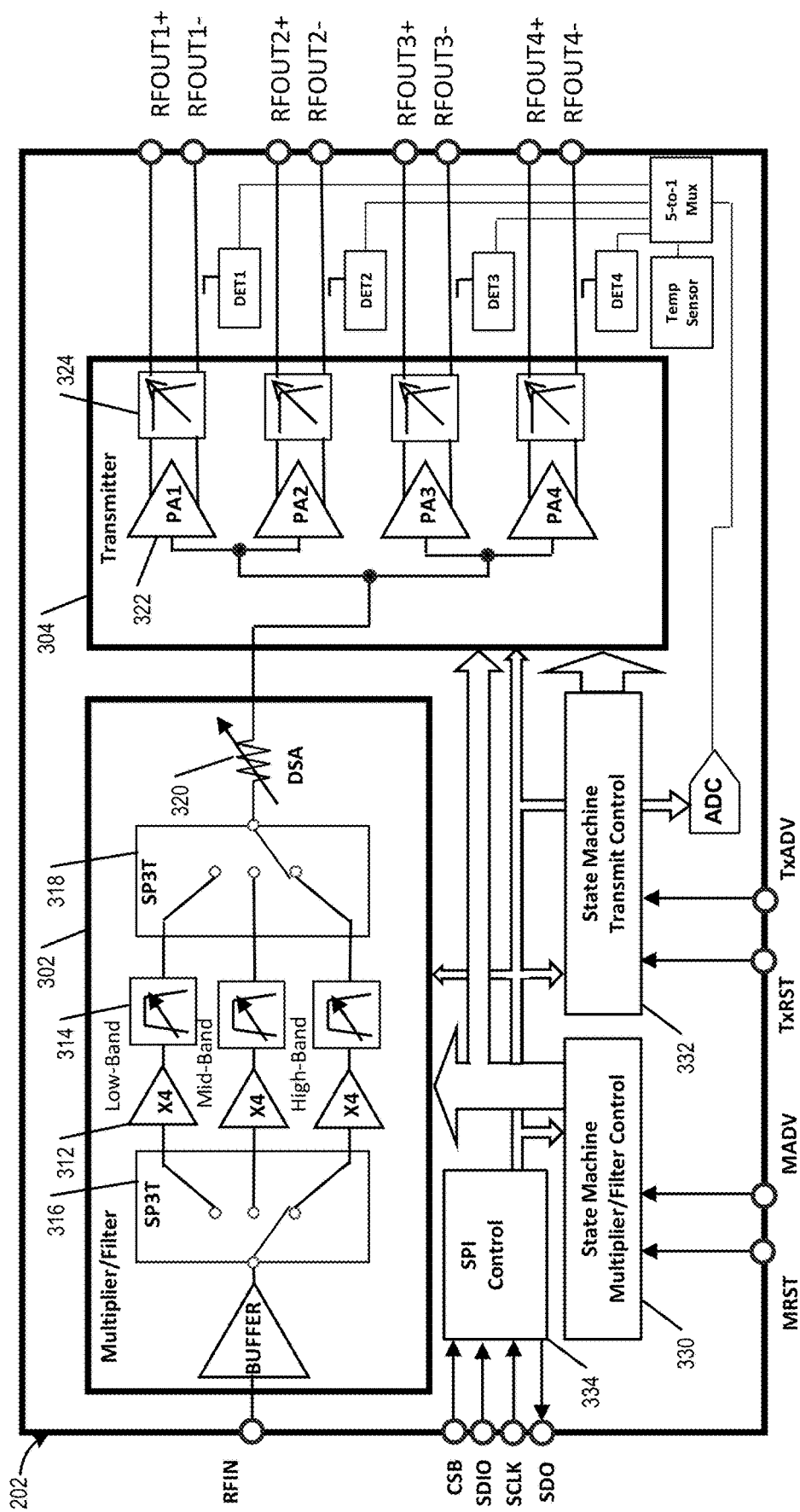
FIG. 3 is a block diagram illustrating an example transmitter integrated circuit in accordance with certain embodiments.

FIG. 3 is a block diagram illustrating an example transmitter integrated circuit 202 in accordance with certain embodiments. The transmitter integrated circuit 202 includes a transmission signal processor 302 and a transmitter 304. The transmission signal processor 302 is configured to receive a local oscillator (LO) signal, which may be received from an RF input. Based on the LO signal, the transmission signal processor 302 is configured to generate a signal for transmission. The transmission signal may be provided to the transmitter 304, which can transmit the transmission signal to a target, such as a user within a body scanner and/or to a receiver integrated circuit 204.

The transmission signal processor 302 may include a number of systems that facilitate generation of the transmission signal based on the LO signal. The systems may include a number of multipliers 312 that can be used to up-convert the LO signal to a higher frequency band. As used herein, the term "up-convert," in addition to its plain and ordinary meaning, includes converting, shifting, or changing a signal frequency to a higher signal frequency. Similarly, as used herein, the term "down-convert," in addition to its plain ordinary meaning, includes converting, shifting, or changing a signal frequency to a lower signal frequency.

Further, the transmission signal processor 302 may include a number of bandpass filters 314 that are configured to permit the converted or multiplied LO signal while removing or restricting frequencies and/or harmonics that are outside of the desired frequency band. The example illustrated in FIG. 3 depicts three pairs of multipliers 312 and bandpass filters 314. It should be understood that more or fewer multipliers and bandpass filters may be included in the transmission signal processor 302. For example, instead of a single low band, mid-band, and high band multiplier and filter pair, the transmission signal processor 302 may include a single low band multiplier and filter pair, two mid-band multipliers a filter pairs, and two high band multiplier and filter pairs.

In addition, the transmission signal processor 302 may include a pair of switches 316 and 318. The switch 316 can direct the received local oscillator signal to the desired multiplier 312. The switch 318 can select the filtered signal to provide to the transmitter 304. Further, the transmission signal processor 302 can include a digital step attenuator (DSA) 320. The DSA 320 can equalize or adjust the signal received from the multiplier filter path prior to providing the signal to the transmitter 304. Further, the DSA 320 can reshape the signal received from the bandpass filter 314 to flatten the signal.

The transmitter 304 may include a number of amplifiers or power amplifiers 322. The power amplifiers 322 may be configured to amplify the converted or multiplied oscillator signal received from the transmission signal processor 302. In certain embodiments, multipliers 312 may alter the frequency band of the received local oscillator signal and the power amplifiers 322 may increase the gain or amplitude of the signal received from the transmission signal processor 302.

Each power amplifier 322 may be associated with a different channel that communicates with a different antenna. The different antennas may direct the signal to different receiver integrated circuits or in different directions. By directing the signal at different receivers or in different directions, it is possible to sense different parts of the target and/or different items carried by the target, such as weapons or other contraband. In addition, the transmitter 304 may include a number of low pass filters 324. The low pass filters 324 may be paired with the power amplifiers 322 and may be configured to remove one or more harmonics from the amplified transmission signal.

In the illustrated example, the transmitter 304 has four channels that may be configured to communicate with one of four different antennas by outputting a signal to one of four different pairs of RF outputs. However, it is possible for the transmitter 304 to support more or fewer channels, which may be in communication with more or fewer antennas. For example, the transmitter 304 may include two channels that communicate with two antennas.

The transmitter integrated circuit 202 may include a pair of state machines 330 and 332. The state machine 330 may configure or control the transmission signal processor 302. At least some of these states of the state machine 330 may generate a different configuration for the transmission signal processor 302. Further, each state of the state machine 330 may configure the switches 316 and 318 to select from the different multipliers 312. By selecting from the different multipliers 312, the state machine 330 can affect the frequency transmitted by the transmitter. Further, the state machine 330 may maintain a particular state or configuration of the transmission signal processor 302 for multiple LO frequencies. For example, an LO generator may modify the LO signal supplied at the RF input within a particular range of frequencies that are associated with a particular configuration of the transmission signal processor 302. For instance, the state machine 330 may maintain a particular configuration of the transmission signal processor 302 when an LO signal is received between 2.5 and 3 GHz. Thus, in this example, the LO signal generator may generate a 2.5 GHz signal at time t1, a 2.6 GHz signal at time t2, and a 2.7 GHz signal at time t3, etc. During each of the times t1, t2, and t3, the state machine 330 may maintain the same configuration of the transmission signal processor 302. If at time t4 a 3.1 GHz signal is supplied as the LO input to the transmitter integrated circuit 202, the state machine 330 may reconfigure the transmission signal processor 302 based on a state associated with the 3.1 GHz LO signal.

The state machine 332 may configure or control the transmitter 304. At least some of the states of the state machine 332 may select a different transmission channel of the transmitter 304. Further, in certain embodiments, the state machine 332 may be configured to control which power amplifiers 322 are active. For example, if the state of the state machine 332 indicates that the channel associated with the fourth power amplifier 322 is to transmit a signal, the state machine 332 may cause the fourth power amplifier 322 to be active while causing the remaining power amplifiers 322 to be inactive, to not receive DC power, or to receive a minimal amount of DC power associated with a sleep state for the inactive channels. Similarly, in certain embodiments, the state machine 330 may cause multipliers 312 associated with communication bands that have not been selected to be placed into a sleep state were to be made in active.

The state machines 330 and 332 may both be programmable state machines that may be programmed by a serial peripheral interface (SPI) 334. In certain embodiments, when the imaging system 200 is started or initiated, the serial peripheral interface 334 may program the state machines 330 and 332 based on control signals received from, for example, the controller 208. In certain embodiments, the SPI 334 may be used to select a start state for the state machines 330 and 332, to synchronize the state machines 330 and 332, or to reset the state machines 330 and 332. In other embodiments, the state machines 330 and 332 may be controlled directly by the controller 208.

Example Receiver Integrated Circuit

Figure 4:
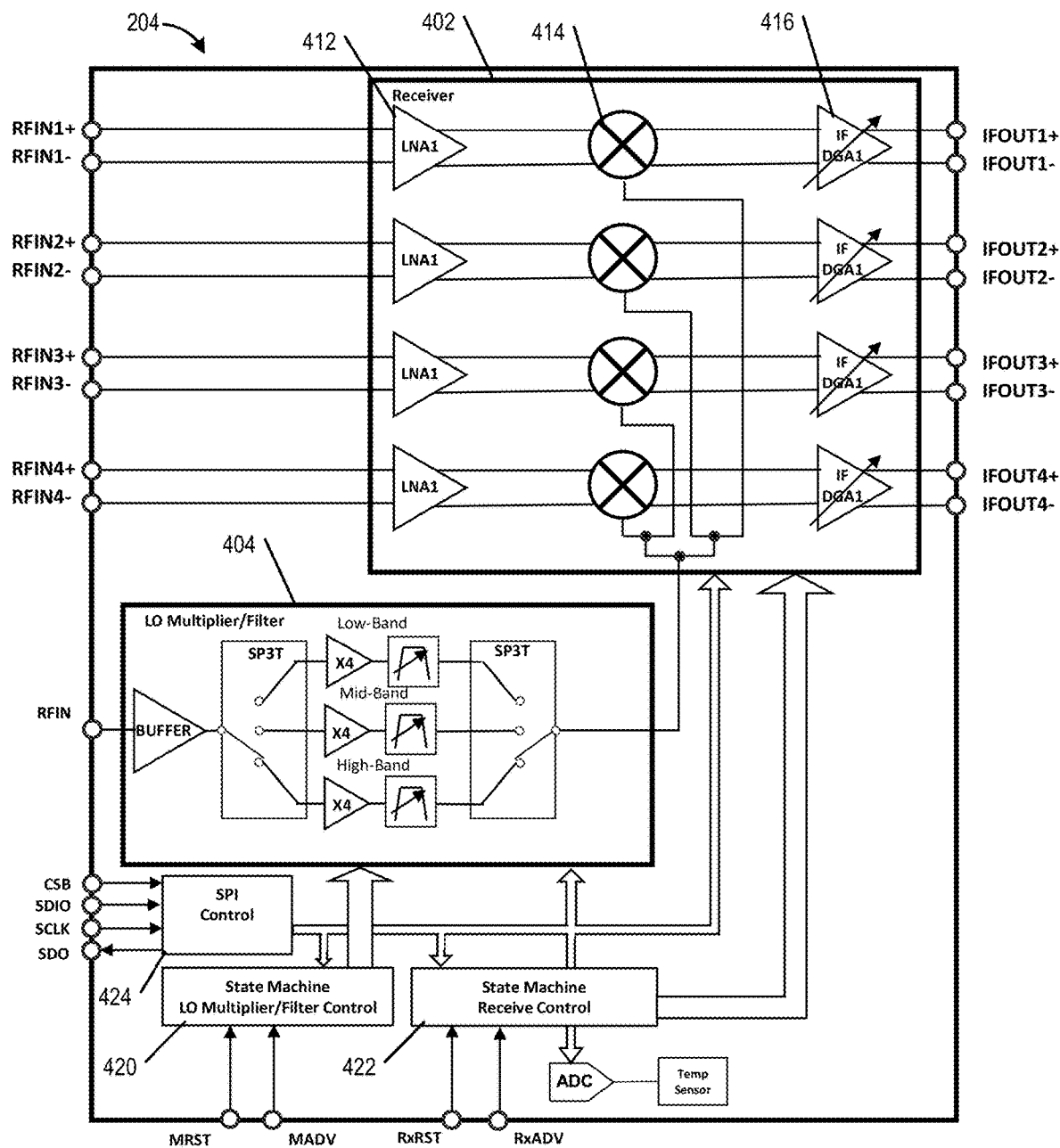
FIG. 4 is a block diagram illustrating an example receiver integrated circuit in accordance with certain embodiments.

FIG. 4 is a block diagram illustrating an example receiver integrated circuit 204 in accordance with certain embodiments. The receiver integrated circuit 204 includes a receiver 402 and a receive signal processor 404. The receiver 402 is configured to receive a signal along one or more of the number of channels of the receiver integrated circuit 204. In certain embodiments, a single channel of the receiver 402 is active in the signal is received along the active channel. In other embodiments, multiple channels of the receiver 402 are active and the signal, or portions thereof, may be received on different channels of the receiver 402. The receiver 402 may include a number of systems for processing the received signal for providing it to a subsequent system, such as an image processor or an imaging circuit 206, which may use the received signal to facilitate generating an image of a target within the imaging system 200. The systems may include a number of low noise amplifiers (LNAs) 412, a number of mixers 414, and a number of digital gain amplifiers 416.

The LNAs 412 may amplify the signal received on the corresponding channel. As with the transmitter integrated circuit 202, the receiver integrated circuit 204 may include a number of channels. For example, the receiver integrated circuit 204 may support two channels or, as illustrated in FIG. 4, four channels. In certain embodiments, an LNA 412 associated with an active receive channel may amplify the receive signal and the remaining LNAs 412 may be inactive. In other embodiments, a plurality or all of the LNAs 412 may be active and may amplify one or more received signals across one or more receive channels of the receiver integrated circuit 204.

The mixers 414 may include one or more signal combiners that can combine a signal on a receive channel with a local oscillator signal received at a RF input. In some embodiments, the mixers 414 combine the received signal received at one of the receive channels with a converted or multiplied version of the local oscillator signal. The converted or multiplied version of the local oscillator signal may correspond to a converted or multiplied version of a local oscillator signal provided to a transmitter integrated circuit 202 that transmitted the signal to the receiver integrated circuit 204. In certain embodiments, the local oscillator signal and/or the multiplied or converted version of the local oscillator signal of the receiver integrated circuit 204 may be offset from one or more of: the signal transmitted by the transmitter integrated circuit 202, the signal received on a receive channel of the receiver integrated circuit 204, and/or the multiplied or converted version of the local oscillator signal of the transmitter integrated circuit 202.

In certain embodiments, the mixers 414 may combine the signal on the receive channel with the signal received from the receive signal processor 404 by translating or mixing one signal with the other signal. For example, the mixer 414 may translate or mix a signal received on a receive channel by the receiver 402 with a signal generated by the receive signal processor 404. By mixing the signal generated by the receive signal processor 404 from the signal received on the receive channel, the resultant signal may be down-converted to a frequency that is roughly equal to the offset frequency that offsets the signal generated by the transmitter integrated circuit 202 from the signal generated by the receive signal processor 404. For example, the transmitter integrated circuit 202 may generate a 10 GHz signal for transmission. This 10 GHz signal may be received on one of the receive channels of the receiver integrated circuit 204. The receive signal processor 404 of the receiver integrated circuit 204 may generate a 9.9 GHz signal based on a local oscillator signal provided to the receive signal processor 404. In certain embodiments, this local oscillator signal may be an offset version of a local oscillator signal provided to the transmitter integrated circuit 202. The mixer 414 may combine the 10 GHz signal received from the transmitter integrated circuit 202 with the 9.9 GHz signal generated by the receive signal processor 404 to obtain a 100 MHz signal. Advantageously, in certain embodiments, by down-converting or reducing the 10 GHz received signal to 100 MHz signal, the signal can be processed and/or sampled more easily compared to maintaining the signal at 10 GHz.

In certain embodiments, the offset between the signal frequency received at the receiver 402 and the signal generated by the receiver signal processor 404 may match or be based on a desired frequency for the output of the receiver integrated circuit 204 (e.g., the IFOUTx signal(s)). Further, the frequency of the signal generated by the receiver signal processor 404 may relate to the signal generated by the transmitter integrated circuit 202. The determination of the local oscillator signal provided to the receiver integrated circuit 204 may be determined by the equation FLOIN=FRFIN−(FIF/4), where FLOIN is the frequency of the Local Oscillator input to the receiver integrated circuit 204 at the RFIN pin of the receiver integrated circuit 204, FRFIN is the RF signal provided to the transmitter integrated circuit 202 on the RFIN pin of the transmitter integrated circuit 202, and Fif is the desired output frequency to be output by the receiver 402. In certain embodiments, the value '4' is used because the multipliers in the illustrated embodiments are ×4. In embodiments where different multiplier values are used in the transmitter signal processor 302 and/or the receiver signal processor 404, the '4' in the equation may be replaced by the utilized multiplier value.

The digital gain amplifiers 416 may amplify a signal on the receive channel prior to providing the signal to a subsequent processing block, such as an imaging circuit 206. Thus, continuing the previous example, the digital gain amplifier 416 can amplify the hundred megahertz signal obtained from the mixer 414.

In certain embodiments, the LNAs 412 may provide a fixed gain and the digital gain amplifiers 416 may provide a variable gain. Alternatively, in certain embodiments, the LNAs 412 may provide a variable gain associated with a smaller variance range and a range of the gain provided by the digital gain amplifiers 416. The variable gain of the digital gain amplifiers 416, and in some cases the LNAs 412, may be determined by the state machine 422 that controls the receiver 402. Further, in certain embodiments, the variable gain may be application specific and/or may be determined by an owner or manufacturer of the imaging system 200.

As previously described, the receive signal processor 404 may generate a converted or multiplied version of a local oscillator signal. Further, as previously described, the converted or multiplied version of the local oscillator signal may be applied to a mixer 414 to facilitate down-converting a received signal at the receiver 402. In certain embodiments, the receive signal processor 404 may include the same or similar elements as the transmission signal processor 302. In some embodiments, the receive signal processor 404 may omit the digital step attenuator that is included in the transmission signal processor 302.

As with the transmitter integrated circuit 202, the receiver integrated circuit 204 may include a pair of state machines 420 and 422 that may respectively control or configure the receive signal processor 404 and the receiver 402. In certain embodiments, the state machines 420 and 422 may control or configure the receive signal processor 404 and the receiver 402 based at least in part on the current state of the state machines 420 and 422. In some embodiments, the state machines 420 and 422 may control or configure the receive signal processor 404 and the receiver 402 based at least in part on one or more control signals received from the controller 208.

As with the state machines 330 and 332, the state machines 420 and 422 may be Programmable state machines that can be programmed by an SPI 424. In certain embodiments, when the imaging system 200 is started or initiated, the serial peripheral interface 424 may program the state machines 420 and 422 based on control signals received from, for example, the controller 208. In certain embodiments, the SPI 424 may be used to select a start state for the state machines 420 and 422, to synchronize the state machines 420 and 422, or to reset the state machines 420 and 422. In other embodiments, the state machines 420 and 422 may be controlled directly by the controller 208. In certain embodiments, the state machines 420 and 422 of the at least one receiver integrated circuit 204 may be synchronized with the state machines 330 and 332 of at least one transmitter integrated circuit 202.

Example Controller Subsystem

Figure 5A:
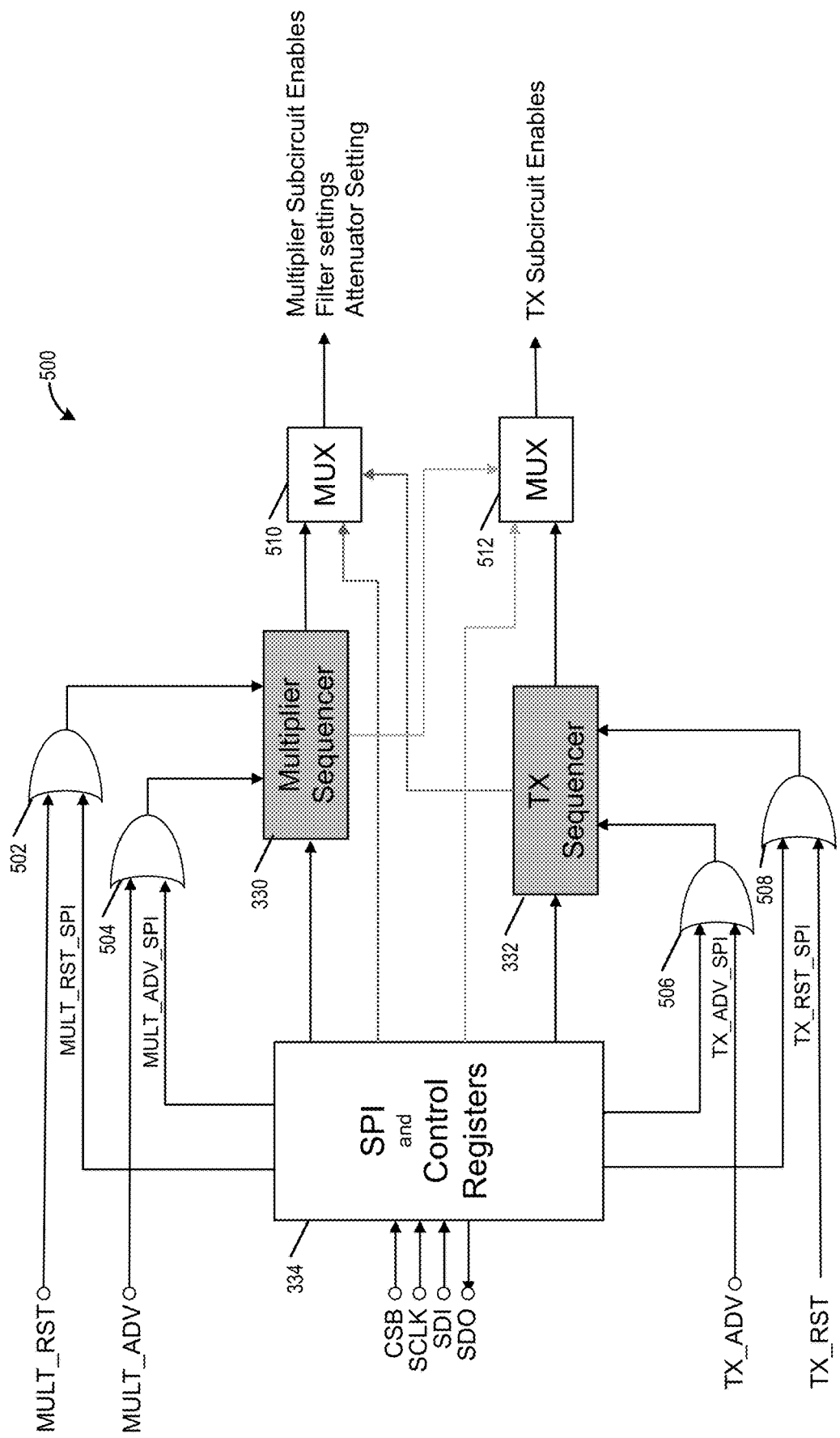
FIG. 5A is a block diagram illustrating an example controller subsystem for an example transmitter integrated circuit in accordance with certain embodiments.

FIG. 5A is a block diagram illustrating an example controller subsystem 500 for an example transmitter integrated circuit in accordance with certain embodiments. In certain embodiments, the controller subsystem for a receiver integrated circuit may be similar or identical to the controller subsystem 500 for the example transmitter integrated circuit. The controller subsystem 500 may include a number of elements within the transmitter integrated circuit for controlling or configuring the transmission signal processor 302 and the transmitter 304. These elements may include the previously described SPI 334, the multiplier state machine 330 and the transmitter state machine 332.

As previously described, the SPI 334 may be used to configure or program the state machines 330 and 332. The SPI 334 may configure or program the state machines 330 and 332 based on one or more signals received from a controller 208 and/or an external computing system that interfaces with the imaging system 200. Further, in certain embodiments, the SPI 334 may be used to control one or more of the state machines 330 and 332 and/or to reset the state machines 330 and 332. In other embodiments, the current state of the state machines 330 and 332 and/or the resetting of the state machines 330 and 332 may be determined by control signals received from the controller 208 or from another control source separate from the SPI 334.

The state machines 330 and 332 may be configured to control or configure the circuitry of the transmission signal processor 302 and the transmitter 304. The multiplier state machine 330 may select a multiplier or multiplier path of the transmission signal processor 302 based on a current state of the state machine 330. Similarly, the transmitter state machine 332 may select a transmission channel of the transmitter 304 to transmit the signal is generated, at least in part, by the transmission signal processor 302.

The controller subsystem 500 may further include digital logic for setting a state of one or more state machines 330 and 332 and/or for resetting the state of one or more of the state machines 330 and 332. There are multiple ways to implement the digital logic for setting and resetting states of the state machines 330 and 332. One non-limiting example of the digital logic is illustrated in FIG. 5A and includes a set of OR gates 502, 504, 506, and 508. The OR gates may adjust the state of the state machines 330 and 332 based on a signal received from the SPI 334 and/or a signal received from a control source external to the transmitter integrated circuit, such as the controller 208. The OR gate 502 may cause the state machine 330 to be reset or enter a starting state. When the state machine 330 is reset or enters a starting state, it may configure the transmission signal processor 302 to be in a particular start configuration. For example, the state machine 330 may configure the transmission signal processor 302 to be in a ready state, to be configured to process a lowest supported frequency band, to be configured to process the highest supported frequency band, or in any other configuration designated as being associated with the reset or starting state. This configuration may be designated when the state machine 330 is programmed by the SPI 334.

Similarly, the OR gate 508 may cause the state machine 332 to be reset or enter a starting state. When the state machine 332 is reset or enters a starting state, it may configure the transmitter 304 to be in a particular state configuration. For example, the state machine 332 may configure the transmitter 304 to be in a ready state, to be configured to transmit along a particular channel, or to be in any other configuration designated as being associated with the reset or starting state.

The OR gate 504 may cause the state machine 330 to transition to a state associated with a different frequency multiplier than a current state. As with the previously described reset or starting state configurations, the state machine 330 may configure the transmission signal processor 302 based at least in part on the state of the state machine 330. Configuring the transmission signal processor 302 may include adjusting the configuration of the transmission signal processor 302 to use a different multiplier and/or bandpass filter to process a signal received at the RF input of the transmitter integrated circuit 202. In some embodiments, configuring the transmission signal processor 302 may further include adjusting a setting of the DSA 320.

Similarly, the OR gate 506 may cause the state machine 332 to transition to a state associated with a different transmission channel than a current state. As with the previously described reset or starting state configurations, the state machine 332 may configure the transmitter 304 based at least in part on the state of the state machine 332. Configuring the transmitter 304 may include adjusting the configuration of the transmitter 304 to use a different communication channel. Configuring the transmitter 304 keys a different indication channel may include causing the transmitter 304 to output a signal along a different output path that leads to a different antenna, to activate or deactivate different power amplifiers 322 of the transmitter 304 or to otherwise alter the configuration of the transmitter 304 to support or use different communication channels.

Figure 5B:
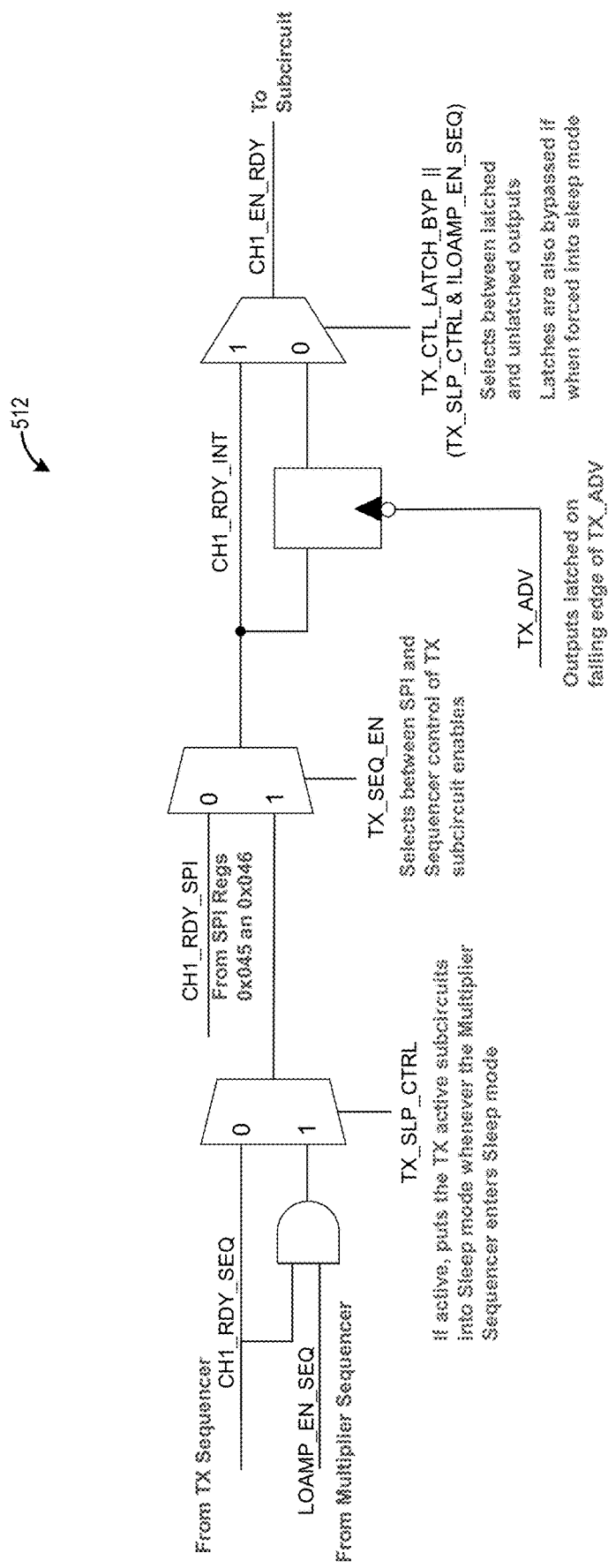
FIG. 5B is a block diagram illustrating an example transmitter multiplexer network in accordance with certain embodiments.
Figure 5C:
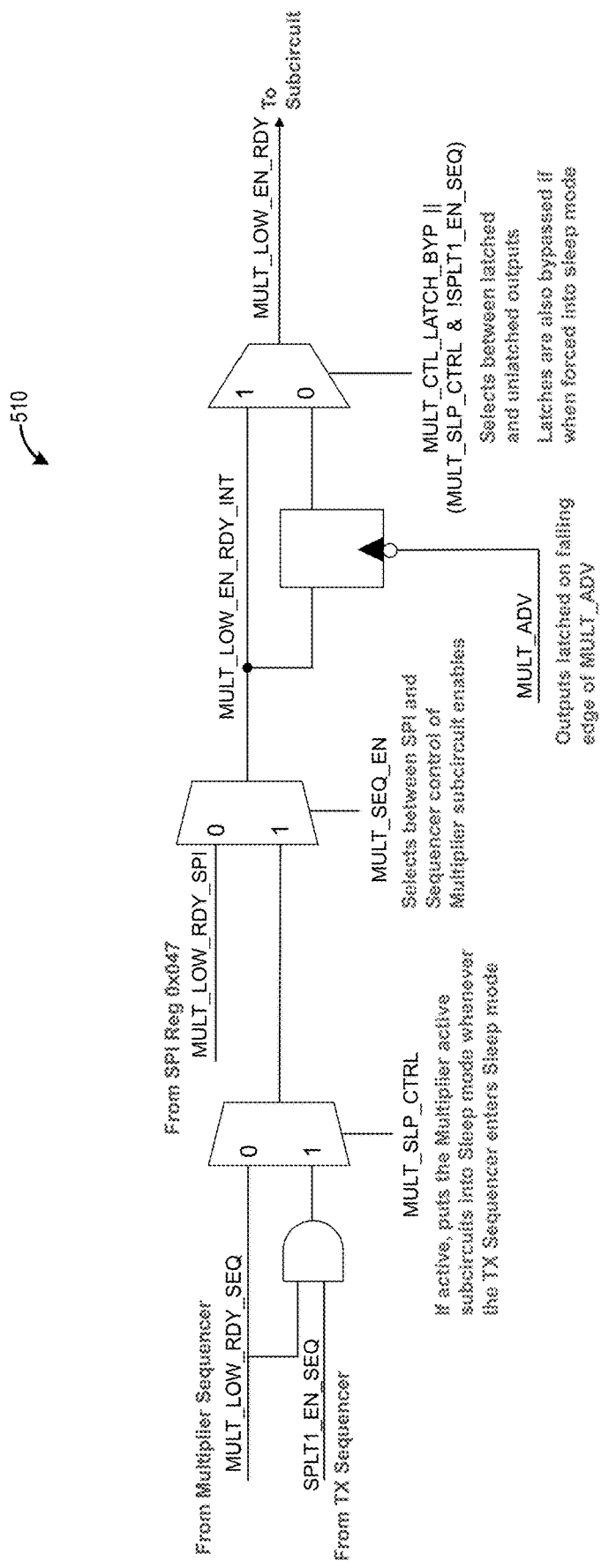
FIG. 5C is a block diagram illustrating an example multiplier multiplexer network in accordance with certain embodiments.

The controller subsystem 500 may further include a pair of multiplexers, or multiplexer circuits, 510 and 512. Although represented as a single multiplexer, in certain embodiments, the multiplexers 510 and 512 may each be multiplexer networks that include multiple multiplexers for selecting between a plurality of different signals. For example, the multiplexer 512 may include a series of three multiplexers with the first multiplexer choosing between a signal from the state machine 332 or a signal from an AND gate that receives a single from both state machines 330 and 332. This first multiplexer enables the transmitter to be placed into a sleep mode when the state machine 330 enters a sleep mode state. A second multiplexer may be used to choose between the state machine signals or a signal from the SPI 334, and a third multiplexer may be used to choose between a latched or unlatched output. An illustration of the example multiplexer 512 is illustrated in FIG. 5B. A similar example for multiplexer 510 is illustrated in FIG. 5C.

The multiplexers 510 and 512 enable a selection between the SPI 334 and the state machines 330 and 332. In certain embodiments, the SPI 334 can directly control or configure the transmission signal processor 302 and/or the transmitter 304. In cases where the SPI 334 is controlling or configuring the transmission signal processor 302 and/or the transmitter 304, the multiplexers 510 and/or 512 may be configured to provide a signal from the SPI 334 to the transmission signal processor 302 and/or the transmitter 304 in place of a signal from the state machines 330 and 332.

Further, in certain embodiments, the multiplexers 510 and 512 enable the state machines 330 and 332 to be tied together without combining the states of the state machines or adding additional states. By tying the state machines 330 and 332 together, it is possible for the state machine 330 to place the transmitter 304 into a sleep mode when a state of the state machine 330 indicates that the transmission signal processor 302 is to enter a sleep mode. Similarly, is possible for the state machine 332 to place the transmission signal processor 302 into a sleep mode when a state of the state machine 332 indicates that the transmitter 304 is to enter a sleep mode. Advantageously, in certain embodiments, by enabling one state machine to place both the transmitter 304 and the transmission signal processor 302 into a sleep mode, it is possible to reduce the number of states included in the state machines 330 and 332 by eliminating or reducing the number of dedicated states required for placing the associated circuitry of the transmitter 304 in the transmission signal processor 302 into a sleep mode. Further, by reducing the number of states included in the state machines 330 and 332, the circuitry of the state machines 330 and 332 can be simplified saving power and money, and reducing the size of the circuitry.

Example Controller

Figure 6:
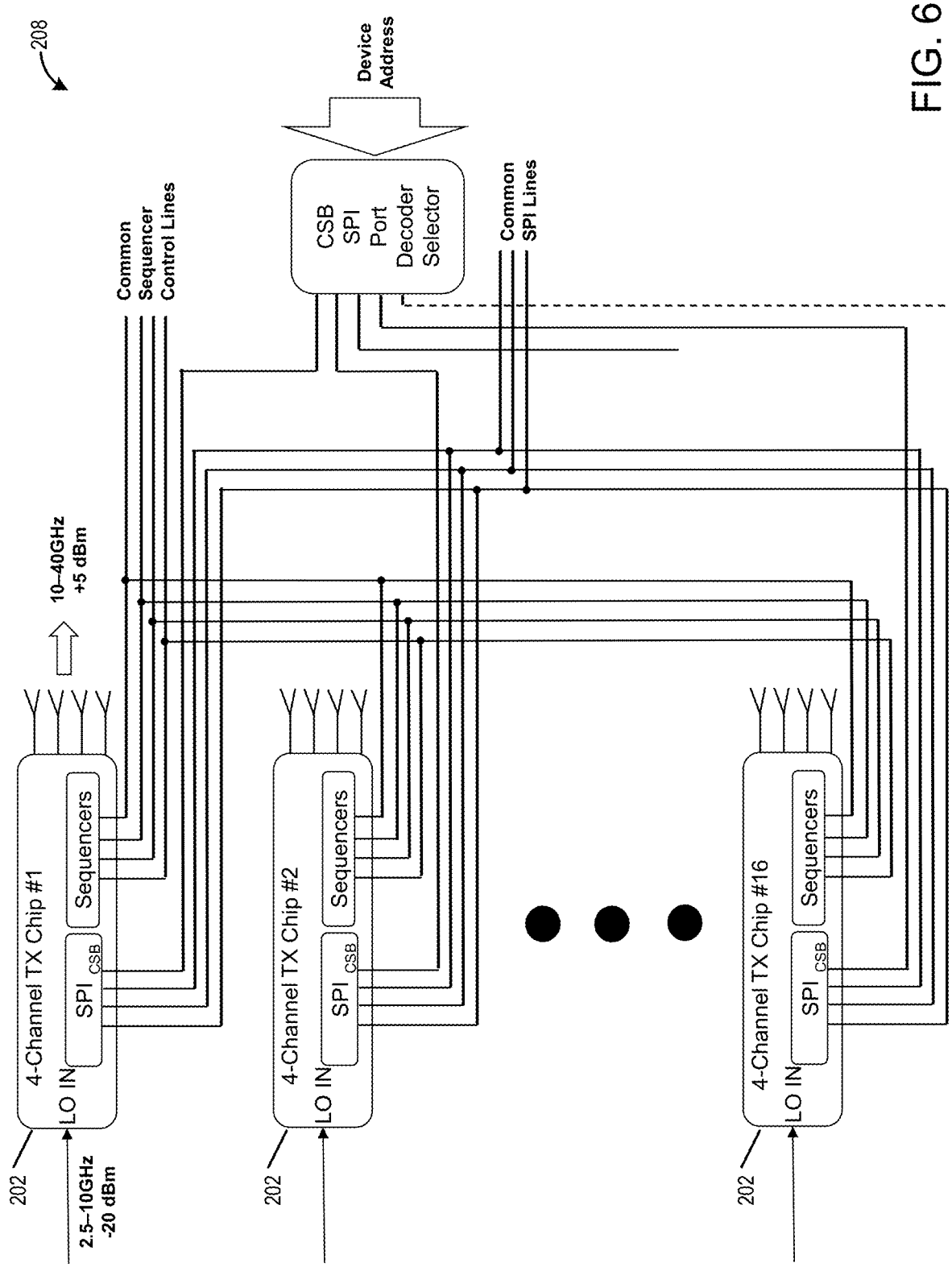
FIG. 6 is a block diagram illustrating an example controller for an example imaging system in accordance with certain embodiments.

FIG. 6 is a block diagram illustrating an example controller 208 for an example imaging system 200 in accordance with certain embodiments. The controller 208 may include any system that is external to the transmitter integrated circuits 202 that can control one or more transmitter integrated circuits 202. The controller 208 may control the transmitter integrated circuits 202 by communicating with a controller 500 of the transmitter integrated circuit 202 that is internal to or part of the transmitter integrated circuit 202.

Although described herein with respect to controlling transmitter integrated circuits 202, the controller 208 may also control receiver integrated circuits 204. Alternatively, or in addition, a separate controller may be used to control the receiver integrated circuits 204. In certain embodiments, the controller for the receiver integrated circuits 204 may perform the same functionality as the controller for the transmitter integrated circuits 202. To simplify discussion, and not to limit the functionality of the controller 208, much of the present disclosure is described with respect to controlling the transmitter integrated circuits 202. In certain embodiments, a controller 208 of the transmitter integrated circuits 202 may be in communication with, or may be synchronized at least in part with a controller of the receiver integrated circuits 204. Advantageously, in certain embodiments, synchronizing the controllers 208 of the receiver integrated circuits and the transmitter integrated circuits enables a receiver integrated circuit and a transmitter integrated circuit to change configuration at the same time or at substantially the same time, or with a particular desired delay offset. For example, it may be desirable in some cases for the receiver to change state 2 ns after a transmitter changes state. By synchronizing the controllers 208 of the receiver integrated circuits and the transmitter integrated circuits, it may be possible to introduce a consistent time delay between a change in configuration state of the receiver integrated circuit and the transmitter integrated circuit. Further, in some embodiments, having a controller 208 of the transmitter integrated circuit in communication with a controller of the receiver integrated circuit enables a consistent configuration or configuration change between the transmitter and receiver integrated circuit (e.g., such as ensuring the use of the same local oscillator frequency, or a particular desired offset between the local oscillator frequencies).

In certain embodiments, the controller 208 may control one or more transmitter integrated circuits 202. For example, in some cases, the controller 208 may control 16 transmitter integrated circuits 202. In some embodiments, the imaging system 200 may include multiple controllers 208. For example, if the imaging system 200 has 1000 transmitter integrated circuits 202 in each controller 208 controls 16 transmitter integrated circuits 202, the imaging system 200 may include 63 controllers 208. Further, if the imaging system 200 has 1000 receiver integrated circuits 204, imaging system 200 may include 126 controllers 208, 63 controllers for the transmitter integrated circuits and 63 controllers for the receiver integrated circuits.

As previously described, during operation, each transmitter integrated circuit 202 may be controlled by one or more state machines that are part of an internal controller of the transmitter integrated circuit 202. The controller 208 may be used to program or configure the state machines that are part of a control circuitry of the transmitter integrated circuit 202. In certain embodiments, the controller 208 may also be used to set or reset a starting state of the state machines that are part of the control circuitry of the transmitter integrated circuit 202. In certain embodiments, the controller 208 may be used to set or advance each state of the state machines that are part of the control circuitry of the transmitter integrated circuit 202. For example, the controller 208 may be used to construct the state machines as to which channel of the transmitter integrated circuit 202 is active and/or as to which multiplier filter path to use to generate the transmission signal.

FIG. 7 illustrates a portion of an example state chart for a set of transmitter integrated circuits controlled by the example controller of FIG. 6 in accordance with certain embodiments. For ease of illustration, the state chart 700 illustrates the state of 8 transmitter integrated circuits under the control of the controller 208. However, it should be understood that the state chart 700 can be extended to provide the state of all 16 of the transmitter integrated circuits 202 of FIG. 6. Moreover, the state chart 700 can be reduced or extended to reflect fewer or more transmitter integrated circuits 202 under the control of the controller 208.

In the state chart 700, the S represents a sleep state, the R represents a ready state, and the CHx values represent the active channel (e.g., channel 1 or channel 2, etc.) for a transmitter integrated circuit 202. The state chart 700 represents a channel sweeping mode for operation of the 16 transmitter integrated circuits 202 controlled by the controller 208. The controller 208 can control which of the 16 transmitter integrated circuits 202 is active at a time. Further, in certain embodiments, the controller 208 can control which channel of the transmitter integrated circuit 202 is active. Alternatively, the state machines 332 of the transmitter integrated circuit 202 may control which channel is active. As illustrated with the state chart 700, a first state represented as state zero may be associated with each of the transmitter integrated circuits being in a sleep mode. At state one, a first transmitter integrated circuit may be placed into a ready mode. When in a sleep mode, the circuitry of the transmitter integrated circuit 202 is not powered or is powered down to a very low state. To transition a transmitter integrated circuit 202 from a sleep state to an operating state where the transmitter integrated circuit 202 is ready to transmit a signal can take as long as 50 ns. To create an image scanner that allows for a user to walk through the scanner without stopping, a 50 ns transition time between a sleep and operating state can be too slow. By placing a transmitter integrated circuit 202 into a ready state one state prior to when the transmitter integrated circuit 202 is to be active reduces the transition time and enables the transmitter integrated circuit 202 to be used with an image scanner that does not require a user to stop and wait to be scanned. The ready state may include applying a small bias to the circuitry of the transmitter integrated circuit 202 enabling the transition from a ready state to an operating state to be significantly reduced. In some embodiments, the transmitter integrated circuit 202 can transition from the ready state to the operating state and magnitude faster than transitioning from the sleep state. For example, in some cases, the transition can be as fast as 1-2 ns. The small bias may be applied to the circuit elements of the transmission signal processor 302 (e.g., the multipliers 312) and/or the transmitter 304 (e.g., the amplifiers 322).

The controller 208 can cycle each transmitter integrated circuit 202 through the four channels of the transmitter integrated circuit 202. Thus, as illustrated in FIG. 7, for states 2-5, channels 1-4, respectively, may be configured to transmit a signal at a target. In states 6-9, channels 1-4 of a second transmitter integrated circuit and be configured to transmit a signal at the target. In certain embodiments, as illustrated with state six and the first transmitter integrated circuit, the transmitter integrated circuit may be placed into a ready state before being placed into a sleep state at state seven. Placing the transmitter integrated circuit into the ready state before placing it into the sleep state ensures that the transmitter of the transmitter integrated circuit is provided with enough time to finish transmitting before being placed into a sleep mode.

After the last transmitter integrated circuit has finish transmitting on its fourth channel, the controller 208 may return to the first state to prepare the first transmitter integrated circuit to begin transmitting on a new frequency. This new frequency may be generated by adjusting the local oscillator supplied to the transmitter integrated circuit 202. For example, if the initial frequency is 10 GHz the controller 208 and/or the state machines of the transmitter integrated circuits may cycle through each channel of each transmitter integrated circuit causing each of the available channels to transmit the 10 GHz signal. Further, if the step size is 100 MHz, the controller 208 and/or the state machines of the transmitter integrated circuits may cycle for each channel the second time to transmit a signal of 10.1 GHz. A third cycle may cause the transmission integrated circuits to transmit a signal of 10.2 GHz, and so on and so forth. If the change in frequency results in a change of the frequency band supported by the previously active multiplier and filter path, the controller 208 may cause the active multiplier and filter path at the transmitter integrated circuit to be changed at state one. For example, if the low band path supports between 10 and 12 GHz, when the frequency reaches 12.1 GHz, the controller 208 may cause the transmitter integrated circuits to transition from the low band path to the mid-band path.

In certain embodiments, the change in the multiplier filter path is controlled internally by the state machine 330 without the controller 208 supplying a signal to the transmitter integrated circuit 202. For example, in certain embodiments, the transmitter integrated circuit 202 may further include a programmable timer as part of an internal control block and/or as part of the state machine 330. In some such embodiments, the timer may trigger the transition between states of the state machine 330 without input from the controller 208. Alternatively, or in addition, in certain embodiments, control of the transmitter integrated circuit 202 may be split between the controller 208 and an internal controller within the transmitter integrated circuit 202. In some such embodiments, the controller 208 may set or initiate the internal controller to a particular state. The internal controller may then control the state machine 330 and the state transitions for the state machine 330. In certain embodiments, the receiver integrated circuit 204 may include one or more similar embodiments as the transmitter integrated circuit 202 for controlling the state machines therein.

When operating in a frequency sweeping mode instead of a channel sweeping mode, the ready states can be eliminated because the transition between transmitter integrated circuits and channels of the transmitter integrated circuits may occur less frequently making the ready state unnecessary. For example, a particular channel of a particular transmitter integrated circuit may transmit a plurality of signals of different frequencies before a new channel is selected. After the imaging system has swept through the entire frequency range supported by the imaging system for a particular channel, the system may transition to it another channel and repeat the process. Similarly, after the frequencies have been transmitted by each of the channels, the system may transition to a new transmitter integrated circuit. In some embodiments, the system may transmit the plurality of signals at the different frequencies for a first channel of a first transmitter integrated circuit and then repeat the process for a channel of another transmitter integrated circuit prior to transmitting the signals on a second channel of the first transmitter integrated circuit.

Figure 8:
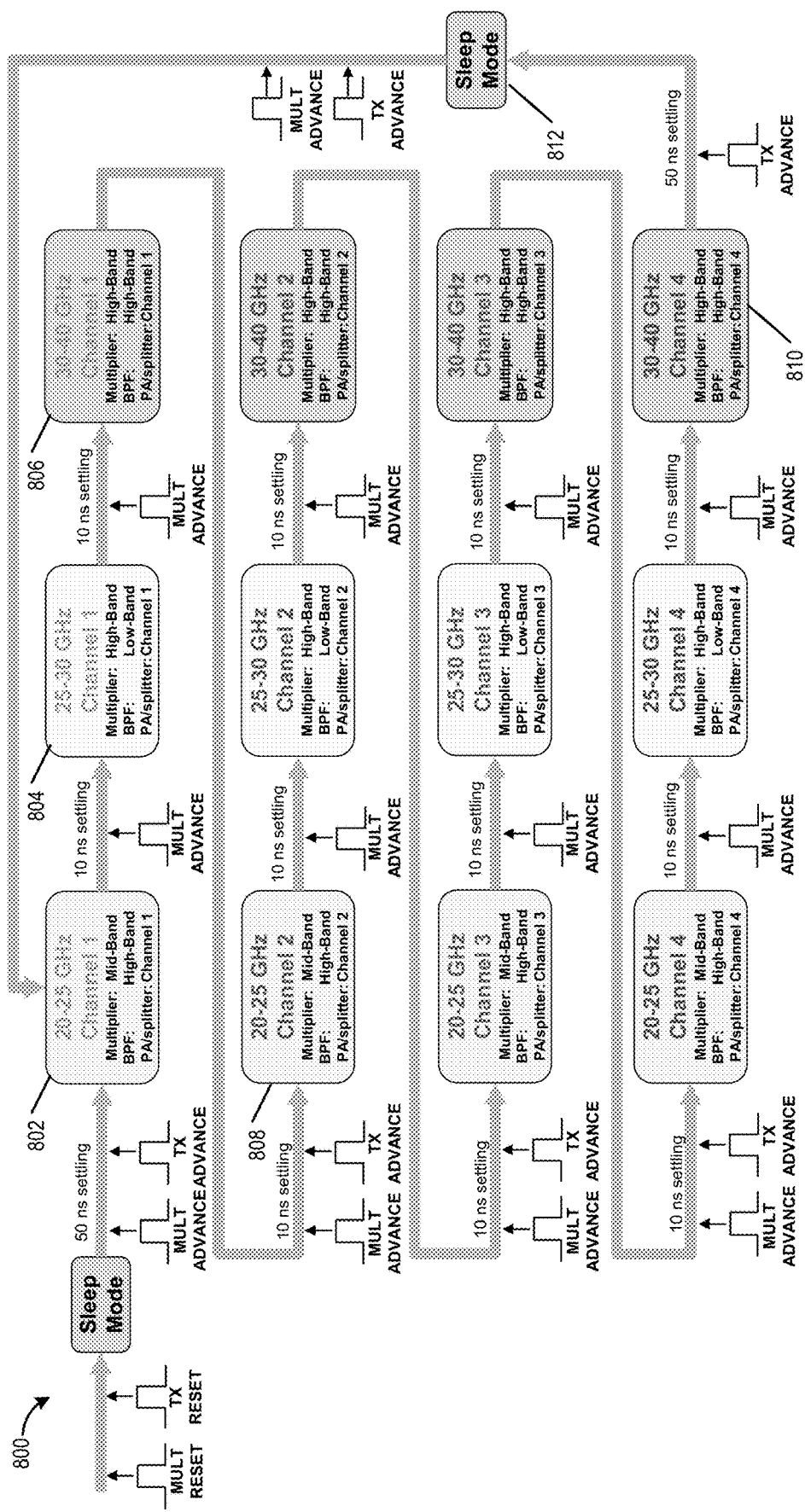
FIG. 8 illustrates a portion of a flow diagram for a transmitter integrated circuit configured to operate in a frequency-sweeping mode in accordance with certain embodiments.

FIG. 8 illustrates a portion of a flow diagram 800 for a transmitter integrated circuit 202 configured to operate in a frequency-sweeping mode in accordance with certain embodiments. The flow diagram 800 represents the operation for a single transmitter integrated circuit 202. Each transmitter integrated circuit 202 may execute a similar flow as illustrated by the flow diagram 800. Further, for ease of illustration, the flow diagram 800 represents a use case where the transmitter integrated circuit 202 operates between 20 and 40 GHz. However, using the embodiments disclosed herein, it is possible for the transmitter integrated circuit 202 to operate over a larger frequency range, such as between 10 and 40 GHz. Further, in certain embodiments, the image scanner 200 can create an image of a user or target with an image quality that is up to a factor of four times better than existing image scanner systems due at least in part to the wider bandwidth. Moreover, in certain embodiments, this improved image quality can be obtained while reducing circuit size. In addition, the improved image quality can be obtained without requiring a user to stop or pause as they walk through the image scanner.

As illustrated by the flow diagram 800, the transmitter integrated circuit 202 may be in a sleep mode when receiving a reset signal from both the multiplier state machine 330 and the transmitter state machine 332. In certain embodiments, because the outputs of the state machines 330 and 332 can be provided to both multiplexers 510 and 512, if either state machine is in a reset mode, the transmitter integrated circuit 202 can be placed into the sleep mode When a non-reset output signal is received from the state machines 330 and 332, such as an advance signal, the transmitter integrated circuit 202 may wake from sleep mode and may configure the transmission signal processor 302 and the transmitter 304 to generate and transmit a signal. In certain embodiments, waking up and configuring the transmission signal processor 302 and the transmitter 304 can be accomplished in up to 50 ns. In the non-liming example illustrated in FIG. 8, the transmitter integrated circuit 202 can be configured to transmit on channel 1 a signal with a frequency between 20-25 GHz upon exiting the sleep mode. It should be understood that other configurations are possible. For example, the transmitter integrated circuit 202 may be configured to transmit starting at channel 4.

In the example illustrated in FIG. 8, the transmitter integrated circuit 202 transitions from the sleep mode to a state 802. In state 802, the state machines 330 and 332 configure the transmitter integrated circuit 202 to use the mid-band multiplier with the high band bandpass filter and to transmit on channel 1. In certain embodiments, a particular multiplier is paired with a particular bandpass filter. Thus, for example, a mid-band multiplier may always be paired with a mid-band bandpass filter. However, in other embodiments, a particular multiplier may be paired with different bandpass filters based at least in part on the current state of the state machine 330. For example, as illustrated with the state 804 and 806, the high band multiplier may be configured to provide a signal to either the low-band bandpass filter or the high-band bandpass filter based on the configuration of the state machine 330.

In certain embodiments, each of the states in the flow diagram 800 may be associated with the transmission of multiple signals of different frequencies. For example, at the state 802, a first signal with a frequency of 20 GHz transmitted over channel 1 will result in the state machines 330 and 332 configuring the transmitter integrated circuit 202 to provide the local oscillator signal to the mid-band multiplier and the high band bandpass filter and then to provide the multiplied and filtered signal to channel one of the transmitter 304 of the transmitter integrated circuit 202. If the second signal to be transmitted has a frequency of 20.1 GHz, the transmitter integrated circuit 202 will remain in the state 802. Further, the transmitter integrated circuit 202 may remain in the state 802, with the configuration associated with the state 802, until a frequency to be transmitted exceeds, or in some cases matches, 25 GHz. The signal that is to be transmitted is often of a higher frequency than the signal received by the transmitter integrated circuit 202 from a local oscillator. As previously described, the signal to be transmitted is multiplied by a multiplier to transform the oscillator signal into the frequency to be transmitted by the transmitter 304 of the transmitter integrated circuit 202. Thus, the multiplier is a 4× multiplier, a 5 GHz local oscillator signal may result in a 20 GHz signal to be transmitted.

When receiving a local oscillator signal of 6.25 GHz, the signal to be transmitted may be 25 GHz. In some such cases, the state machine 330 may cause a change in the selection of the multiplier. This is represented in the flow diagram 800 by the transition from state 802 to state 804. Transitioning state of the transmitter integrated circuit 202 to use a different multiplier and/or a different bandpass filter may take up to 10 ns. This process of sweeping the supported frequency range and reconfiguring the transmission signal processor 302 to use different multipliers and/or bandpass filters may be repeated until the maximum supported frequency is reached.

Once the maximum supported frequency is reached, the state machine 330 may cause the transmission signal processor 302 to return to the configuration utilized in transmitting a signal of the minimum supported frequency as indicated by state 808. As seen from the flow diagram 800, the configuration of the transmission signal processor 302 at the state 808 matches the configuration of the transmission signal processor 302 at the state 802. However, at the state 808, the state machine 332 may reconfigure the transmitter 304 to transmit from channel 2 instead of channel 1.

The process of sweeping through the different supported frequencies for a particular channel and then repeating the process for a subsequent channel may continue until the signal associated with each of the frequencies has been transmitted by each of the channels. After a 40 GHz signal is transmitted via channel four of the transmitter integrated circuit 202 at state 810, the transmitter integrated circuit 202 may return to a sleep mode at state 812.

The transmitter integrated circuit 202 may remain in the sleep mode 812 until a repeat of the process associated with the flow 800 is triggered. The process asserted with the flow 800 may be triggered by command from a user or when a target is detected as moving through the image scanner 200 or an apparatus including image scanner 200.

As an alternative to operating in a frequency sweeping mode, the transmitter integrated circuit 202 may be configured to operate in a channel sweeping mode. In a channel sweeping mode, one or more signals of a particular frequency or frequency range may be transmitted across each of the channels of the transmitter integrated circuit 202 before transmitting one or more signals of a different frequency or frequency range.

Figure 9:
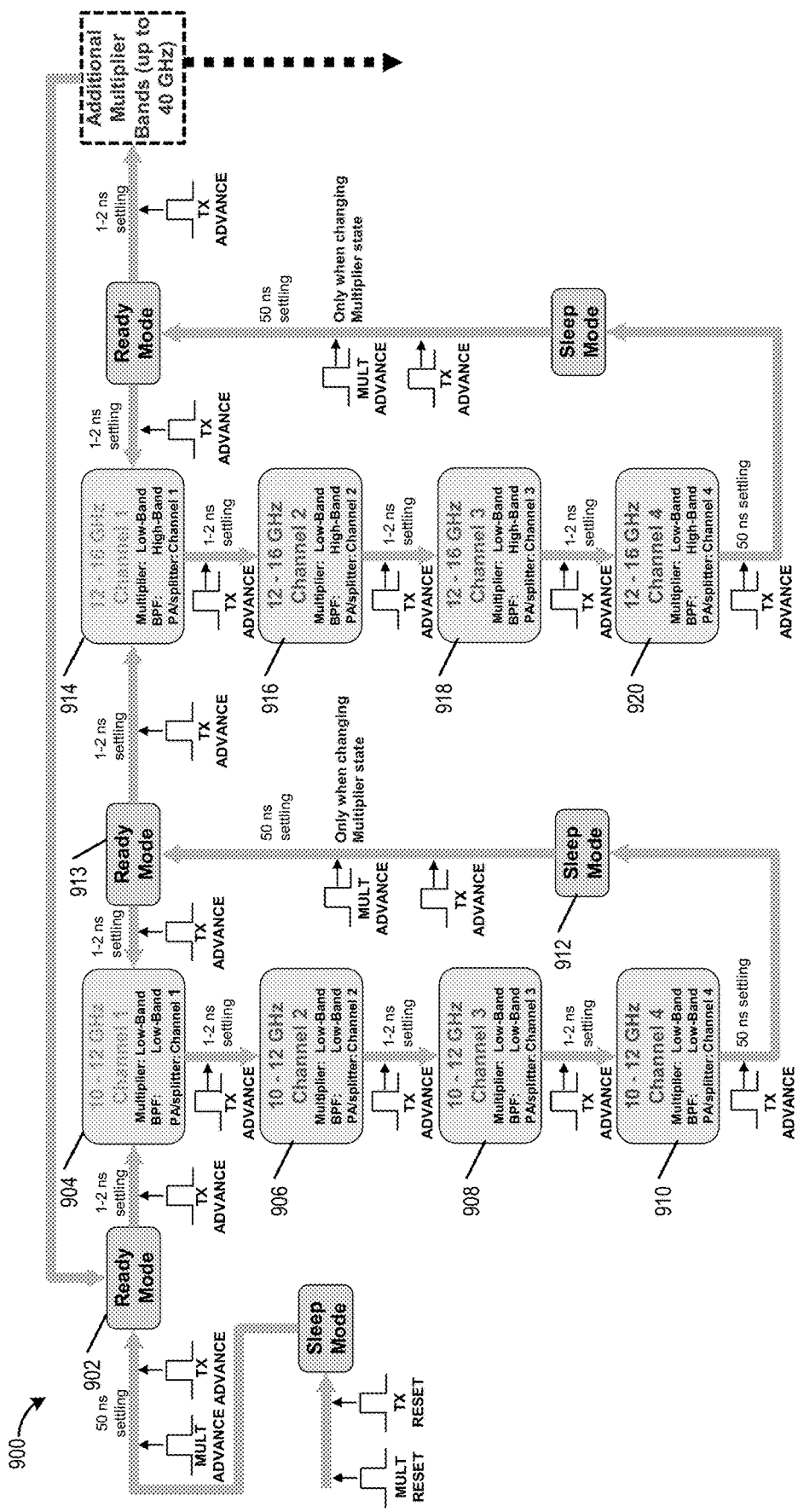
FIG. 9 illustrates a portion of a flow diagram for a transmitter integrated circuit configured to operate in a channel-sweeping mode in accordance with certain embodiments.

FIG. 9 illustrates a portion of a flow diagram 900 for a transmitter integrated circuit configured to operate in a channel-sweeping mode in accordance with certain embodiments. As with a flow diagram 800, flow diagram 900 has been simplified to show communication of signals between 10 and 16 GHz across four channels. However, it should be understood that a transmitter integrated circuit 202 may support a fewer or greater number of channels that may communicate over a lesser or greater frequency range.

Further, as with a flow diagram 800, the flow diagram 900 may begin with the transmitter integrated circuit in a sleep mode. When it is determined that the transmitter integrated circuit 202 is to begin transmitting a signal or may soon begin transmitting a signal, the transmitter integrated circuit 202 may be transition from the sleep mode to a ready mode 902. Transitioning the transmitter integrated circuit 202 from a sleep mode to a ready mode 902 may take up the 50 ns and may include supplying a bias current to circuit elements of the transmitter integrated circuit 202 enabling the transmitter integrated circuit 202 to more quickly transition from a non-transmitting state to a transmitting state.

The transmitter integrated circuit 202 may transition from the ready mode 902 to a first operating state 904 in as little as 1 to 2 ns. That the first operating state 904, the state machines 330 and 332 may configure the transmission signal processor 302 and the transmitter 304 to transmit signals between 10 and 12 GHz across channel 1. When a 12 GHz signal has been transmitted, the flow diagram 900 may transition to state 906. At state 906, the transmitter integrated circuit 202 may again be configured to transmit signals between 10 and 12 GHz. However, the transmitter 304 may now be configured to transmit the signals across channel 2. The transmission signal processor 302 may remain similarly configured as in the state 904. The process of transmitting signals between 10 and 12 GHz may be repeated at state 908 for channel 3 and again at state 910 for channel 4. The transition between each channel may occur within 1 to 2 ns. In other words, the state machine 332 may reconfigure the transmitter 304 within 1 to 2 ns.

After each of the channels has completed transmitting a set of signals between 10 and 12 GHz, the transmitter integrated circuit 202 may be placed in a sleep mode 912. The process of transmitting signals between 10 and 12 GHz may be repeated with other transmitter integrated circuits. Alternatively, or in addition, the process of transmitting signals across a frequency range for each of the channels of the transmitter integrated circuit 202 may be repeated for a different frequency range as illustrated by the states 914, 916, 918, and 920. As illustrated by the flow diagram 900, when the transmitter integrated circuit 202 is transmitting signals and the range of 10 to 12 GHz, the transmission signal processor 302 may be configured to process the local oscillator signal with the low band multiplier and the low band bandpass filter. When the transmitter integrated circuit 202 transitions to the state 914 and the transmission of signals between 12 and 16 GHz, the transmission signal processor 302 may be configured by the state machine 332 to use the low band multiplier and the high band bandpass filter. The process of sweeping between the different channels supported by the transmitter integrated circuit 202 for different sets of frequencies may be repeated for the entire frequency range supported by the transmitter integrated circuit 202.

In certain alternative embodiments, each channel may transmit a single signal of a particular frequency or frequency band. The channels may sequentially transmit the signal. For example, in certain embodiments, when the transmitter integrated circuit 202 enters state 904, a signal with a frequency between 10-12 GHz may be transmitted. The state machines 330 and 332 may configure the transmission signal processor 302 and the transmitter 304, respectively, to enable the transmission of a signal within the 10-12 GHz band over channel 1. The system may then transition to state 906 where the transmitter integrated circuit 202 is configured to transmit a signal between 10-12 GHz over channel 2. Typically the signal is the same signal as was transmitted at state 904. However, the present disclosure is not limited as such and it is possible for a different signal between 10-12 GHz to be transmitted via channel 2 at state 906.

After a signal is transmitted via channel 4 at the block 910, the transmitter integrated circuit 202 may be placed into a sleep mode at the block 912. The transmitter integrated circuit 202 may then enter a ready mode at the block 913. This ready mode may be similar to or the same as the ready mode at the block 902. Based at least in part on a state of the state machine 330, the state machine 332, and/or a signal received at the RF input to the transmitter integrated circuit 202, it can be determined whether to return to the block 904 where another signal with a frequency between 10-12 GHz is transmitted via channel 1, or whether to proceed to the block 914 where a signal with a frequency between 12-16 GHz is transmitted via channel 1.

In some embodiments, multiple transmitter integrated circuits may transmit signals of particular frequencies prior to at least one of the transmitter integrated circuits transmitting signals of another set of particular frequencies. In other words, a first transmitter integrated circuit may transmit signals between 10 and 12 GHz, and subsequently a second transmitter integrated circuit may transmit signals between 10 and 12 GHz prior to the first transmitter integrated circuit transmitting signals between 12 and 16 GHz.

Example Frequency Sweeping Scanning Process

Figure 10:
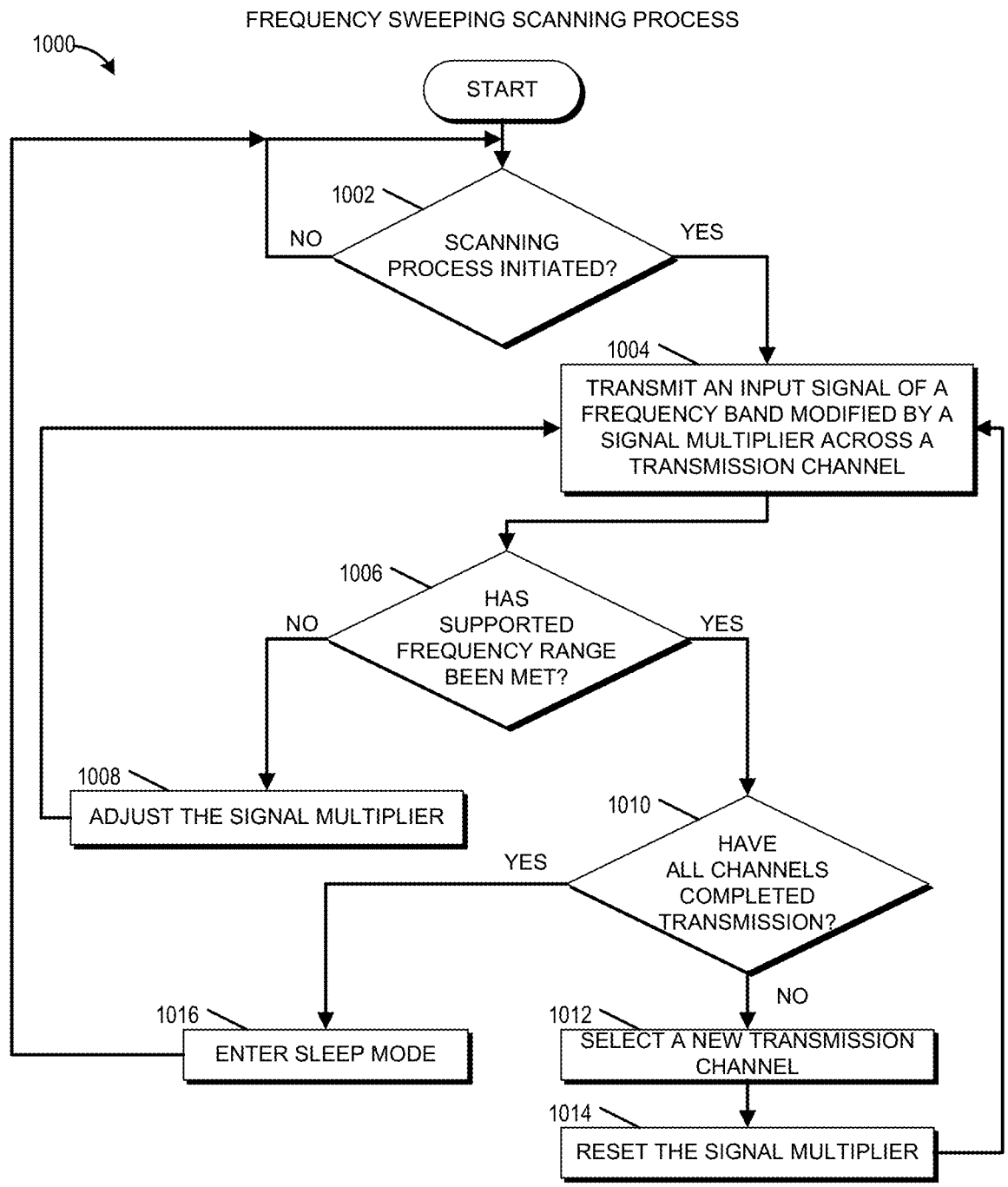
FIG. 10 presents a flowchart of an example frequency sweeping scanning process in accordance with certain embodiments.

FIG. 10 presents a flowchart of an example frequency sweeping scanning process 1000 in accordance with certain embodiments. Some or all of the process 1000 can be implemented by any transmitter system that can transmit a plurality of signals of different frequencies. The process 1000, in whole or in part, can be implemented by, for example, a transmitter integrated circuit 202, a transmission signal processor 302, a transmitter 304, a state machine 330, a state machine 332, or a controller 208, to name a few.

Although some elements of the process 1000 may be implemented by a number of different systems, to simplify discussion elements of the process 1000 will be described with respect to particular systems. Further, the process 1000 may be performed with respect to a single transmitter integrated circuit 202 or with respect to a plurality of transmitter integrated circuits.

The process 1000 begins at decision block 1002 when, for example, the controller 208 determines whether a scan process of a target has been initiated. The scanning process may be initiated by a command or by detection of the target within the scanner that includes the transmitter integrated circuit 202, such as a scanner that includes the imaging system 200.

If it is determined at the decision block 1002 that a scanning process has not been initiated, the process 1000 repeats the operations associated with the decision block 1002 until it is determined that a scanning process has been initiated. Repeating the operations associated with the decision block 1002 may include maintaining the transmitter integrated circuit 202, or one or more sub-circuits thereof, in a sleep mode.

If it is determined at the decision block 1002 that a scanning process has been initiated, the transmitter integrated circuit 202 transmits an input signal of a particular frequency band modified by a signal multiplier across a transmission channel of the transmitter integrated circuit 202 at block 1004. The block 1004 may include waking the transmitter integrated circuit 202 from a sleep mode. Further, in some cases, the block 1004 may optionally include placing the transmitter integrated circuit 202 into a ready mode prior to configuring the transmitter integrated circuit 202 to transmit a signal.

In some embodiments, the block 1004 may include transmitting a plurality of signals associated with a particular sub band of the supported frequency band of the transmitter integrated circuit 202. For example, the block 1004 may include transmitting a plurality of signals between 10 and 12 GHz that are modified by an active signal multiplier. Signals outside of the 10 to 12 GHz range may be associated with a different sub band of the supported frequency band and may be processed by a different signal multiplier as further described below. In some embodiments, the block 1004 may include filtering the multiplied input signal via a bandpass filter. Further, in certain embodiments, the block 1004 may include transmitting the modified input signal across a transmission channel of a plurality of transmitter integrated circuits. For example, the signal may be generated and transmitted across a first channel of two, three, or four transmitter integrated circuits, or any other number of transmitter integrated circuits of a target scanning system. Moreover, in certain embodiments, the block 1004 may be repeated for a plurality of signals separated by a particular step size within the supported frequency band or sub band. For example, for a supported frequency band of 10 to 12 GHz with the step size of 100 MHz, the block 1004 may be repeated for a signal of 10 GHz, 10.1 GHz, 10.2 GHz, etc.

At decision block 1006, the controller 208 determines whether a supported frequency range has been met. Determining whether the supported frequency range has been met may include determining whether a range of signals has been transmitted across each sub band of a supported frequency band of the transmitter integrated circuit 202. For example, if the transmitter integrated circuit supports a frequency range of between 10 and 25 GHz divided into three sub bands of 5 GHz each (e.g., a 10 to 15 GHz band, a 15 to 20 GHz band, and a 20 to 25 GHz band), the decision block 1006 may include determining whether signals associated with each of the three sub bands have been generated and transmitted by the transmitter integrated circuit 202. In this previous example, each sub band may be associated with a different signal multiplier. If it is determined that signals associated with one of the sub bands have not yet been transmitted, it may be determined that the supported frequency range has not yet been met.

If it is determined at the decision block 1006 that the supported frequency range has not been met, the state machine 330 adjusts at block 1008 a selection of the signal multiplier at the transmission signal processor 302. Adjusting the selection of the signal multiplier may include modifying the configuration of the transmission signal processor 302 to provide a local oscillator signal to a different signal multiplier combination. In certain embodiments, instead of or in addition to adjusting the signal multiplier at the block 1008, the state machine 330 may adjust a selection of a bandpass filter used to filter the multiplied local oscillator signal received at the transmission signal processor 302 of the transmitter integrated circuit 202. Subsequent to the operations of the block 1008, the process 1000 returns to the block 1004 where an input signal associated with a different frequency band is modified by the active signal multiplier and transmitted across the transmission channel.

If it is determined at the decision block 1006 that the supported frequency range has been met, the controller 208 determines at decision block 1010 whether all channels of the transmitter integrated circuit 202 have finished transmitting a set of signals across the supported frequency range of the transmitter integrated circuit 202. For example, if the transmitter integrated circuit 202 supports a frequency range between 10 and 40 GHz and has four different transmission channels, the decision blocks 1006 and 1010 may include determining whether signals separated by a particular step size have been transmitted across the entire range of 10 to 40 GHz for each of the four different transmission channels.

If it is determined at the decision block 1010 that not all channels of the transmitter integrated circuit 202 have finished transmitting a set of signals across a supported frequency range, the state machine 332 selects a new transmission channel of the transmitter 304 at the block 1012. Selecting a new transmission channel may include configuring the transmitter 304 of the transmitter integrated circuit 202 to transmit signals across a different channel, which may include transmitting using a different antenna in communication with the transmitter integrated circuit 202. In certain embodiments, the transmitter integrated circuit 202 may be associated with or have a single channel. In such embodiments, the blocks 1010, 1012, and 1014 may be omitted in the process 1000 may proceed to block 1016 when it is determined at the decision block 1006 that the supported frequency range has been met.

At block 1014, the state machine 330 resets the signal multiplier. Resetting the signal multiplier may include configuring the transmission signal processor 302 to use a signal multiplier associated with the lowest supported frequency range of the transmitter integrated circuit 202. It should be understood that a frequency sweeping process is not limited to sweeping a frequency from a lowest supported frequency to a highest supported frequency. In some embodiments, the frequency sweeping process may be performed from a highest supported frequency to a lowest supported frequency. In some such embodiments, resetting the signal multiplier may include configuring the transmission signal processor 302 to use a signal multiplier associated with the highest supported frequency range of the transmitter integrated circuit 202.

Subsequent to resetting the signal multiplier at the block 1014, the process 1000 returns to the block 1004 where an input signal associated with a frequency band (such as the lowest or highest frequency band) is modified by the active signal multiplier and transmitted across the new transmission channel. Thus, in certain embodiments, the transmitter integrated circuit 202 may be configured to repeat the operations associated with the blocks 1004, 1006, and 1008 for the entire supported frequency range of the transmitter integrated circuit 202 using a different transmission channel than a previous iteration of the sub process associated with the blocks 1004, 1006, and 1008.

In certain embodiments, the selection of a new transmission channel of the block 1012 and/or the resetting of the signal multiplier at the block 1014 may occur with respect to a different transmitter integrated circuit 202. As previously described, the scanner that includes the imaging system 200 may include a plurality of transmitter integrated circuits. In certain embodiments, the process 1000 may be performed serially or at least partially in parallel with respect to a plurality of transmitter integrated circuits. Thus, in certain embodiments, portions of the process 1000 may be performed with respect to a first channel of a first transmitter integrated circuit and a first channel of a second transmitter integrated circuit prior to performing portions of the process 1000 with respect to a second channel of the first transmitter integrated circuit.

If it is determined at the decision block 1010 that all the channels have completed transmission, one or more of the state machines 330 and 332 places the transmitter integrated circuit 202 into a sleep mode. In certain embodiments, it is determined at the decision block 1010 that all channels of completed transmission, the transmitter integrated circuit 202 will have transmitted signals across all of the channels of the transmitter integrated circuit 202 associated with the entire supported frequency band of the transmitter integrated circuit 202. Transmitting signals across the entire supported frequency band may not necessarily include transmitting a signal at every frequency that may include transmitting signals at each frequency across the frequency band associated with or separated by a particular step size. For example, if the step size is 100 MHz, the transmitter integrated circuit 202 may transmit a signal at 10 GHz, 10.1 GHz, 10.2 GHz, etc. up to the maximum supported frequency, but may not, for example, transmit a signal at 10.01 GHz or 10.02 GHz, etc. After entering sleep mode, the process 1000 may return to the decision block 1002 to await the next occurrence of a scanning process trigger.

In certain embodiments, the process 1000 can be modified or adapted for use with a receiver integrated circuit 204. In such embodiments, instead of configuring a transmission signal processor and transmitter to transmit particular signals of particular frequencies across particular transmission channels, the process 1000 can configure a receive signal processor 404 and a receiver 402 using the state machines 420 and 422 to receive and process the particular signal on a particular receive channel of the receiver integrated circuit 204. In some embodiments, other receive channels of the receiver 402 may be placed into a sleep mode. In other embodiments, all of the receive channels of the receiver 402 may remain active and any signals or signal components receive the each of the receive channels of the receiver 402 may be provided to a subsequent circuit for processing, such as to an imaging circuit 206 for generating an image of a target based at least in part on the received signals from one or more channels of the receiver integrated circuit 204 and/or from one or more receiver integrated circuits.

Example Channel Sweeping Scanning Process

Figure 11:
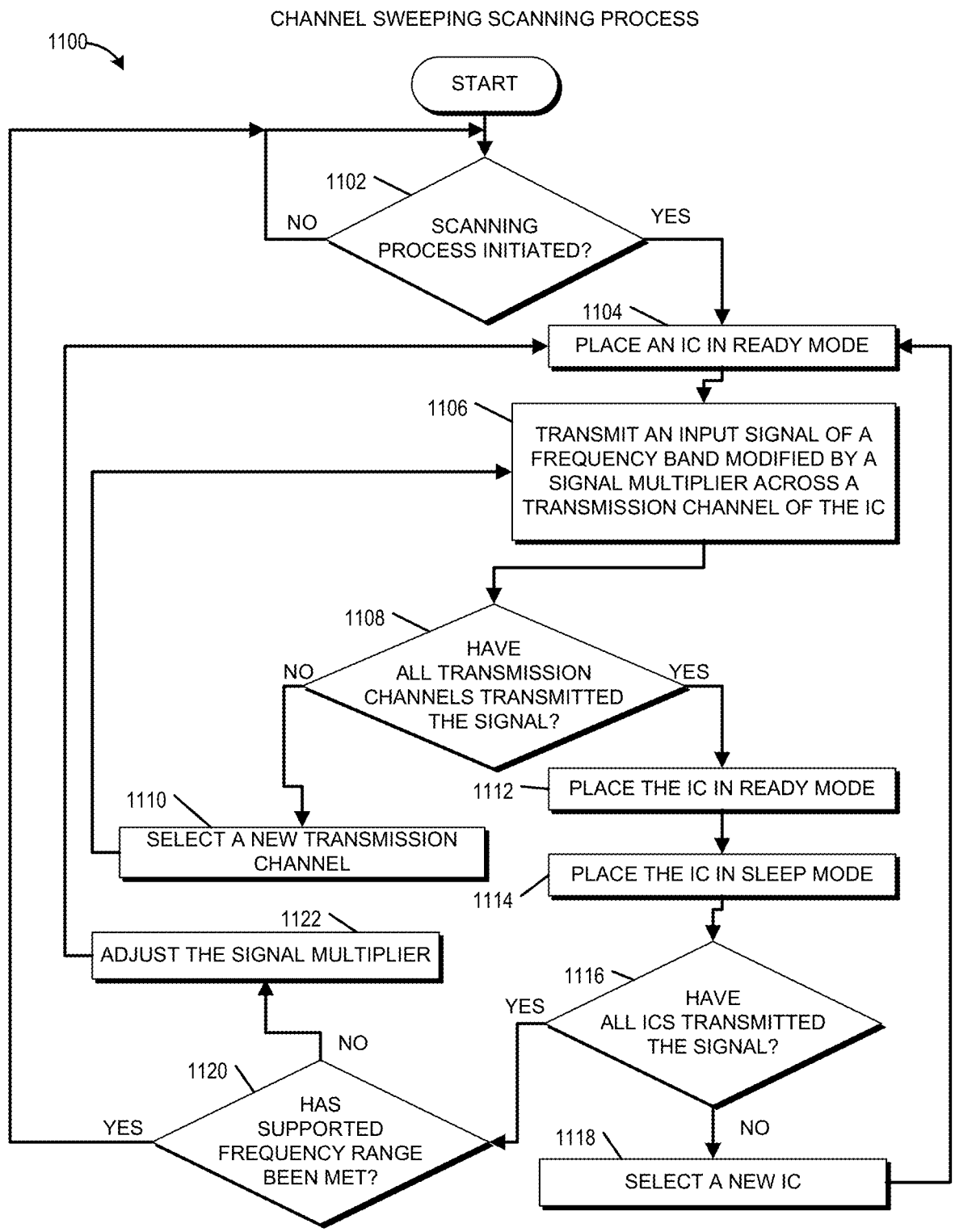
FIG. 11 presents a flowchart of an example channel sweeping scanning process in accordance with certain embodiments.

FIG. 11 presents a flowchart of an example channel sweeping scanning process 1100 in accordance with certain embodiments. Some or all of the process 1100 can be implemented by any transmitter system that can transmit at least one signal across a plurality of channels. The process 1100, in whole or in part, can be implemented by, for example, a transmitter integrated circuit 202, a transmission signal processor 302, a transmitter 304, a state machine 330, a state machine 332, or a controller 208, to name a few. Although some elements of the process 1100 may be implemented by a number of different systems, to simplify discussion elements of the process 1100 will be described with respect to particular systems. Further, the process 1100 may be performed with respect to a single transmitter integrated circuit 202 or with respect to a plurality of transmitter integrated circuits.

The process 1100 begins at decision block 1102 when, for example, the controller 208 determines whether a scanning process of the target has been initiated. The decision block 1102 may include one or more of the embodiments previously described with respect to the decision block 1002.

If it is determined at the decision block 1102 that a scanning process has not been initiated, the process 1100 repeats the operations associated with the decision block 1102 until it is determined that a scanning process has been initiated. Repeating the operations associated with the decision block 1102 may include maintaining the transmitter integrated circuit 202, or one or more sub-circuits thereof, in a sleep mode.

If it is determined at the decision block 1102 that a scanning process has been initiated, the transmitter integrated circuit 202 is placed in a ready mode at block 1104. In some embodiments, the decision block 1102 and/or the operations associated with the block 1104 may be initiated or performed by the controller 208. Alternatively, or in addition, operations associated with the block 1104 may be performed by one or more of the state machines 330 and 332. Placing the transmitter integrated circuit 202 in a ready mode may include biasing at least some circuitry, such as one or more amplifiers 322, with a minimal operating current. Advantageously, in certain embodiments, by biasing at least some of the circuitry with a minimal operating current, the transmitter integrated circuit 202 can transition from a non-transmitting mode to a transmitting mode in less time than other transmitters. For example, the transmitter integrated circuit 202 can transition from a ready mode to a transmitting mode in as little as 1 to 2 ns whereas some existing systems may take more than 50 ns, and some existing systems may take up to a few milliseconds to transition to a transmitting state.

At block 1106, the transmitter integrated circuit 202 transmits an input signal of a frequency band modified by signal multiplier across a particular transmission channel of the transmitter integrated circuit 202. In other words, in certain embodiments, the signal to be transmitted may be an input signal, such as a local oscillator signal, has been multiplied by signal multiplier. Further, in certain embodiments, the signal to be transmitted may be a signal filtered by bandpass filter. In certain embodiments, the block 1106 may include one or more of the embodiments previously described with respect to the block 1004. In certain embodiments, the block 1106 may include transmitting a single signal of a particular frequency across the transmission channel. In other embodiments, the block 1106 may include transmitting across a transmission channel a plurality of signals of which at least some may be of a different frequency than at least some other of the plurality of signals.

At decision block 1108, the controller 208 determines whether all the transmission channels of the transmitter integrated circuit 202 have transmitted the signal. In some embodiments, the decision block 1108 may include determining whether all of the transmission channels of the transmitter integrated circuit have transmitted a plurality of signals associated with a particular frequency range.

If it is determined at the block 1108 that the transmitter integrated circuit 202 includes a channel that has not transmitted the signal, the transmitter integrated circuit 202 selects a new transmission channel at the block 1110. This new transmission channel may be selected from one or more transmission channels that as of yet have not transmitted the signal during the particular instance of the scanning process. Selecting the new transmission channel may include the state machines 332 configuring the transmitter 304 to transmit the signal over a different channel. In some embodiments, configuring the transmitter 304 to transmit over different channel may include activating or biasing a different power amplifier 322 and the power amplifiers 322 associated with the prior to transmitting channel.

After selecting the new transmission channel of the process 1100 may return to the block 1106 where one or more signals of a particular frequency band may be transmitted over the new transmission channel. In certain embodiments, the transmission integrated circuit 202 may include a single channel. In such embodiments, the decision block 1108 and the block 1110 may be omitted.

If it is determined at the block 1108 that the transmitter integrated circuit 202 has transmitted the signal across each of its channels, the process 1100 may proceed to block 1112 where the transmitter integrated circuit 202 is placed in a ready mode. As with the block 1104 of the block 1112 may include biasing at least some circuitry of the transmitter integrated circuit 202 with a minimal operating current. At block 1114, the transmitter integrated circuit 202 is placed in a sleep mode. Placing the transmitter integrated circuit 202 into a sleep mode may include biasing at least some circuitry of the transmitter integrated circuit 202 with no current or a minimal current that is less than the minimal operating current. This minimal current may be determined as sufficient to maintain a state of the circuitry, but may be less than an amount of current required to operate the circuitry. Advantageously in certain embodiments, by placing the transmitter integrated circuit 202 in a ready mode prior to placing the transmitter integrated circuit into the sleep mode ensures that the transmitter integrated circuit 202 has sufficient time to finish transmitting the signals prior to entering a sleep state.

At decision block 1116, the controller 208 may determine whether all of the available transmitter integrated circuits 202 have transmitted the signal. If it is determined at the decision block 1116 that not all of the transmitter integrated circuits 202 have transmitted the signal, the controller 208 may select a transmitter integrated circuit at the block 1118 from a set of one or more transmitter integrated circuits that have yet to transmit the signal. The transmitter integrated circuit 202 selected at the block 1118 may be selected based at least in part on a location of the transmitter integrated circuit 202, a location of the target being scanned, a preset ordering of the transmitter integrated circuits, or any other factor for determining an order in which the transmitter integrated circuits 202 are to transmit signals during a scanning process of a target. Subsequent to selecting a new transmitter integrated circuit the block 1118, the process 1100 returns to the block 1104 where the new transmitter integrated circuit is placed in a ready mode.

If it is determined at the decision block 1116 that all of the transmitter integrated circuits have transmitted the signal, or at least a particular subset of the transmitter integrated circuits, the process 1100 proceeds to the decision block 1120 where it is determined whether the supported frequency range for the transmitter integrated circuits has been met. Determining whether the supported frequency range for the transmitter integrated circuits has been met includes determining whether all of the transmitter integrated circuits, release a particular subset of the transmitter integrated circuits, have transmitted a set of signals across the entire supported frequency range. For example, if the supported frequency range is 2-4 GHz with a step size of 500 MHz, the decision block 1120 may include determining whether each of the transmitter integrated circuits as transmitted the signal at frequency 2 GHz, 2.5 GHz, 3 GHz, 3.5 GHz, and 4 GHz. If it is determined that the supported frequency range for the transmitter integrated circuits has been met at the decision block 1120, the process 1100 returns to the decision block 1102 where the imaging system 200 may await a trigger to initiate a new instance of the scanning process.

If it is determined at the decision block 1120 that the supported frequency range for the transmitter integrated circuits is not been reached, the process 1100 proceeds to the block 1122 or a state machine 330 adjusts the selection of a signal multiplier for the transmitter integrated circuit 202. In certain embodiments, the block 1122 may include one or more of the embodiments previously described with respect to the block 1008. The process 1100 may then return to the block 1104 where the transmitter integrated circuit 202 is placed in the ready mode. Alternatively, the process 1100 may proceed from the block 1122 to the block 1106 because, for example, the transmitter integrated circuit 202 may already be in a ready mode or may be placed in the ready mode as part of the selection of the signal multiplier.

In certain embodiments, as with the process 1000, the process 1100 may be modified or adapted for use with a receiver integrated circuit 204. In such embodiments, a set of configuring a transmission signal processor and transmitter to transmit particular signals across particular transmission channels, the process 1100 can configure a receive signal processor 404 and a receiver 402 using the state machines 420 and 422 to receive and process the particular signal on a particular receive channel of the receiver integrated circuit 204. In some embodiments, other receive channels of the receiver 402 may be placed into a sleep mode. In other embodiments, all of the receive channels of the receiver 402 may remain active and any signals or signal components received by each of the receive channels of the receiver 402 may be provided to a subsequent circuit for processing, such as to an imaging circuit 206 for generating an image of a target based at least in part on the received signals from one or more channels of the receiver integrated circuit 204 and/or from one or more receiver integrated circuits. In some embodiments where all of the receive channels remain active, the state machine 422 may be configured to maintain each of the receive channels in an active mode. Further, the state machine 420 may be configured to place the receive channels in a sleep mode by, for example, using a multiplexer that enables the state machine 420 to be used to control the receiver 402 instead of or in addition to the state machine 422. Advantageously, in certain embodiments, enabling the state machine 420 to place the receiver 402 into a sleep mode enables the SPI 424 to be simplified by eliminating the need for the SPI to turn one or more receive channels on of off.

In certain embodiments, each transmitter integrated circuit 202 may be configured based on received control signals, such as those that may be provided by the controller 208. For example, the transmitter integrated circuit 202 may receive a set of control signals at a set of input pins. These control signals may be received at input pins that provide the control signals to the state machines 330 and 332. Based on these control signals, the state machine 330 and the state machine 332 may each determine a current state. Alternatively, or in addition, the state machines 330 and 332 may determine the current state based at least in part on the previous state of the state machines 330 and 332. The input signals received at the state machines 330 and 332 may be used to determine a starting state or to reset a state of the state machines 330 and 332.

Further, based on the current state of the state machine 330, the state machine 330 may control the configuration of the transmission signal processor 302. Controlling the configuration of the transmission signal processor 302 may include controlling a position of the switches 316 and 318 to select a particular signal path associated with a particular multiplier 312 and 314. This signal path may be selected based at least in part on the expected local oscillator signal that is to be received at the RFIN pin. The transmitter integrated circuit 202 may determine the expected local oscillator signal based on the current state of the state machine 330.

Based on the current state of the state machine 332, the state machine 332 may select a communication channel at the transmitter 304 to transmit the signal generated by the transmission signal processor 302. Selecting the communication channel can include configuring a power amplifier 322 to amplify a signal received from the transmission signal processor 302. The signal may be output via one or more output pins associated with the selected channel, which may provide the output signal to an antenna associated with the channel for transmission. The remaining power amplifiers 322 of the transmitter may be configured by the state machine 332 to block the signal or to not amplify the signal received from the transmission signal processor 302. Alternatively, a switch may select the transmit channel of the transmitter 304 based on a control signal received from the state machine 332.

In certain embodiments, the receiver integrated circuit 204 may operate similarly to the transmitter integrated circuit 202. However, the receiver integrated circuit 204 may receive a transmitted signal and down-convert the frequency of the signal by, for example, mixing the received signal with the signal generated by the receive signal processor 404. The down-converted signal may be output by the receiver integrated circuit 204 and provided to a subsequent system for processing, such as an image processor that may generate an image of a target based at least in part on the down-converted signal. Alternatively, or in addition, the subsequent system may include an analog to digital converter (ADC), or a field programmable gate array (FPGA) or computer system than implements an image reconstruction application.

Terminology and Conclusion

Principles and advantages discussed herein can be used in any device to scan a target, such as a human, with a body scanner. Further, embodiments disclosed herein can use a set of programmable state machines to reduce the scan time of the target and to reduce the size of the integrated circuits included in the scanner for scanning the target.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Some or all of any the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A receiver integrated circuit for receiving a signal within an imaging system to generate an image of a target, the receiver integrated circuit comprising:
   a receive signal processor configured to multiply an oscillator signal by a multiplication factor to generate a target oscillator signal within a target frequency band and to filter one or more harmonics from the target oscillator signal, wherein the target frequency band is one of a plurality of target frequency bands;
   a receiver configured to receive a receive signal from one of a plurality of antennas, wherein the target oscillator signal is offset from the receive signal by an offset frequency; and
   a first state machine configured to control the receive signal processor by configuring the receive signal processor to operate within a selected target frequency band of the plurality of target frequency bands based at least in part on a current state of the first state machine.

2. The receiver integrated circuit of claim 1, further comprising a second state machine configured to control the receiver.

3. The receiver integrated circuit of claim 2, wherein the second state machine is configured to control the receiver by at least selecting a receive channel to be active from a plurality of receive channels based at least in part on a current state of the second state machine.

4. The receiver integrated circuit of claim 2, further comprising a first multiplexer configured to provide a first control signal to the receive signal processor, wherein the first multiplexer is controlled by the second state machine enabling the second state machine to provide a sleep mode signal to the receive signal processor when the second state machine is in a sleep state.

5. The receiver integrated circuit of claim 2, further comprising a second multiplexer configured to provide a second control signal to the receiver, wherein the second multiplexer is controlled by the first state machine enabling the first state machine to provide a sleep mode signal to the receiver when the first state machine is in a sleep state.

6. The receiver integrated circuit of claim 1, wherein the receive signal processor comprises a configurable multiplier that is configured to generate a target oscillator frequency of the selected target frequency band of the plurality of target frequency bands based at least in part on the current state of the first state machine.

7. The receiver integrated circuit of claim 1, wherein the receive signal processor comprises a configurable bandpass filter that is configured to filter one or more harmonics associated with a different target frequency band of the plurality of target frequency bands based at least in part on the current state of the first state machine.

8. The receiver integrated circuit of claim 1, wherein the receiver comprises an amplifier configured to amplify the receive signal to generate an amplified receive signal.

9. The receiver integrated circuit of claim 8, wherein the receiver further comprises a mixer configured to mix the amplified receive signal with the target oscillator signal to generate an output signal, wherein the output signal matches a frequency of the offset frequency.

10. The receiver integrated circuit of claim 9, wherein the receiver further comprises a digital gain amplifier configured to amplify the output signal by a variable gain amount, wherein the low noise amplifier amplifies the receive signal by a fixed gain amount.

11. An imaging system configured to generate an image of a target, the imaging system comprising:
    a plurality of transmitter integrated circuits; and
    a plurality of receiver integrated circuits, wherein each of the plurality of receiver integrated circuits comprises:
       a receive signal processor configured to multiply an oscillator signal by a multiplication factor to generate a target oscillator signal within a target frequency band and to filter one or more harmonics from the target oscillator signal, wherein the target frequency band is one of a plurality of target frequency bands;
       a receiver configured to receive a receive signal from one of a plurality of antennas, wherein the target oscillator signal is offset from the receive signal by an offset frequency; and
       a first state machine configured to control the receive signal processor by configuring the receive signal processor to operate within a selected target frequency band of the plurality of target frequency bands based at least in part on a current state of the first state machine.

12. The imaging system of claim 11, wherein the receive signal received at the one of the plurality of antennas is transmitted by a transmitter integrated circuit from the plurality of transmitter integrated circuits.

13. The imaging system of claim 11, wherein each of the plurality of receiver integrated circuits further comprises a second state machine configured to control the receiver of the receiver integrated circuit by at least selecting a receive channel to be active from a plurality of receive channels based at least in part on a current state of the second state machine.

14. The imaging system of claim 13, wherein each of the plurality of receiver integrated circuits further comprises a first multiplexer configured to provide a first control signal to the receive signal processor of the receiver integrated circuit, wherein the first multiplexer is controlled by the second state machine enabling the second state machine to provide a sleep mode signal to the receive signal processor when the second state machine is in a sleep state.

15. The imaging system of claim 13, wherein each of the plurality of receiver integrated circuits further comprises a second multiplexer configured to provide a second control signal to the receiver of the receiver integrated circuit, wherein the second multiplexer is controlled by the first state machine enabling the first state machine to provide a sleep mode signal to the receiver when the first state machine is in a sleep state.

16. The imaging system of claim 11, wherein the receive signal processor comprises a configurable multiplier that is configured to generate a target oscillator frequency of the selected target frequency band of the plurality of target frequency bands based at least in part on the current state of the first state machine.

17. The imaging system of claim 11, wherein the receive signal processor comprises a configurable bandpass filter that is configured to filter one or more harmonics associated with a different target frequency band of the plurality of target frequency bands based at least in part on the current state of the first state machine.

18. The imaging system of claim 11, wherein the receiver comprises an amplifier configured to amplify the receive signal to generate an amplified receive signal.

19. The imaging system of claim 18, wherein the receiver further comprises a mixer configured to mix the amplified receive signal with the target oscillator signal to generate an output signal, wherein the output signal matches a frequency of the offset frequency.

20. The imaging system of claim 19, wherein the receiver further comprises a digital gain amplifier configured to amplify the output signal by a variable gain amount, wherein the low noise amplifier amplifies the receive signal by a fixed gain amount.

* * * * *